(12) United States Patent
Tsotsis et al.

(10) Patent No.: US 8,106,142 B2
(45) Date of Patent: Jan. 31, 2012

(54) POLYACETYLINIC OLIGOMERS

(75) Inventors: Thomas K. Tsotsis, Orange, CA (US); Norman R. Byrd, Villa Park, CA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 12/582,394

(22) Filed: Oct. 20, 2009

(65) Prior Publication Data

US 2010/0204485 A1 Aug. 12, 2010

Related U.S. Application Data

(63) Continuation-in-part of application No. 12/367,125, filed on Feb. 6, 2009.

(51) Int. Cl.
*C08G 8/26* (2006.01)

(52) U.S. Cl. ........ 528/128; 528/321; 528/171; 528/331; 528/332; 528/271; 528/364; 528/170; 528/403; 528/391; 528/423; 525/417; 525/421; 525/422; 525/451; 525/534

(58) Field of Classification Search .................. 528/128, 528/321, 171, 331, 322, 271, 364, 170, 403, 528/391, 377, 423; 525/417, 422, 421, 534, 525/451

See application file for complete search history.

(56) References Cited

U.S. PATENT DOCUMENTS

| | | | |
|---|---|---|---|
| 4,739,030 A | 4/1988 | Lubowitz et al. | |
| 4,851,501 A | 7/1989 | Lubowitz et al. | |
| 4,935,523 A | 6/1990 | Lubowitz et al. | |
| 5,071,941 A | 12/1991 | Lubowitz et al. | |
| 5,594,089 A | 1/1997 | Lubowtiz et al. | |
| 5,599,993 A | 2/1997 | Hergenrother et al. | |
| 5,610,317 A | 3/1997 | Lubowtiz et al. | |
| 5,654,396 A | 8/1997 | Lubowitz et al. | |
| 5,681,967 A | 10/1997 | Hergenrother et al. | |
| 5,689,004 A | 11/1997 | Connell et al. | |
| 5,714,566 A | 2/1998 | Lubowtiz et al. | |
| 5,756,597 A | 5/1998 | Lubowtiz et al. | |
| 5,817,744 A | 10/1998 | Sheppard et al. | |
| 5,969,079 A | 10/1999 | Lubowitz et al. | |
| 5,998,550 A | 12/1999 | Arnold et al. | |
| 6,124,035 A | 9/2000 | Connell et al. | |
| 6,136,949 A | 10/2000 | Earls et al. | |
| 6,344,523 B1 | 2/2002 | Hawthorne et al. | |
| 6,441,099 B1 | 8/2002 | Connell et al. | |
| 6,569,954 B1 | 5/2003 | Sheppard et al. | |
| 6,911,519 B2 | 6/2005 | Scola et al. | |
| 2003/0158351 A1 | 8/2003 | Smith et al. | |
| 2004/0006196 A1 | 1/2004 | Scola et al. | |

OTHER PUBLICATIONS

Han et al. (Euro. Polym. J., 43, 2007, 1541-1548).*
Jensen et al. (Polymer Preprints, 38, 1, p. 180-181, 1997).*

* cited by examiner

*Primary Examiner* — Randy Gulakowski
*Assistant Examiner* — Shane Fang
(74) *Attorney, Agent, or Firm* — Alston & Bird LLP

(57) ABSTRACT

Polyacetylinic oligomers suitable for high-temperature polymer-matrix composites are provided. The polyacetylinic oligomers have the formula:

D-A-D wherein

D is an endcap including at least one crosslinking functionality; and

A is backbone selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone. At least one ethynyl functional group, however, is incorporated into the backbone such that crosslinking is not only realized at the endcaps but also at the ethynyl groups within the backbone of the oligomer itself.

7 Claims, No Drawings

POLYACETYLINIC OLIGOMERS

CROSS-REFERENCE TO RELATED APPLICATIONS

This application is a continuation-in-part of U.S. patent application Ser. No. 12/367,125, which was filed on Feb. 6, 2009. The contents of U.S. patent application Ser. No. 12/367,125 are incorporated herein by reference in their entirety.

BACKGROUND OF THE DISCLOSURE

The present disclosure relates generally to polyacetylinic oligomers, and more particularly to polyacetylinic oligomers with multi-functional endcaps.

Only a few of the thermosetting resins that are commonly used today in fiber-reinforced composites generally can be used in high-temperature applications. These high-temperature thermosetting resins are undesirable in many applications because they often form brittle composites that have relatively low thermal stabilities.

Recently, chemists have sought to synthesize oligomers for high-performance, high-temperature advanced composites suitable for aerospace applications. Most formulations for high-temperature polymer-matrix composites have monofunctional endcaps which limit the degree of crosslinking that can be attained. There is a need for high-performance composites to exhibit solvent resistance, be tough, impact resistant, strong, and be easy to process. There is also a need for oligomers and composites that have thermo-oxidative stability, and can be used at elevated temperatures for extended periods of time.

While epoxy-based composites are suitable for many applications, they are inadequate for applications which require thermally stable, tough composites that are expected to survive for a long time in a hot, oxidizing environment. Recent research has focused on polyimide composites to achieve an acceptable balance between thermal stability, solvent resistance, and toughness for these high-performance applications. Still the maximum temperatures for use of the polyimide composites, such as those formed from PMR-15, can only be used at temperatures below about 600-625° F. (315-330° C.), since they have glass-transition temperatures of about 690° F. (365° C.). PMR composites may be usable in long-term service (50,000 hours) at about 350° F. (170° C.). They can withstand temperatures up to about 600° F. (315° C.) for up to about five hundred hours.

PMR-15 prepregs, however, suffer significant processing limitations that hinder their adoption because the prepreg has a mixture of the unreacted monomer reactants on the fiber-reinforcing fabric, making them sensitive to changes in temperature, moisture, and other storage conditions, which cause the prepregs to be at different stages of cure. Aging these PMR prepregs even in controlled environments can lead to problems. The reactants on the prepreg are slowed in their reaction by keeping them cold, but the quality of the prepreg depends on its absolute age and on its prior storage and handling history. And, the quality of the composite is directly proportional to the quality of the prepregs. In addition, for some formulations like PMR-15, the PMR monomers may be toxic or hazardous (especially methylendianiline or MDA in PMR-15), presenting health and safety concerns for the workforce. Achieving complete formation of stable imide rings in the PMR composites remains an issue. These and other problems plague PMR-15 composites.

The commercial long-chain polyim ides also present significant processing problems. AVIMID-N and AVIMID-KIII (trademarks of E.I. duPont de Nemours) resins and prepregs differ from PMR-15 because they do not include aliphatic chain terminators which PMR-15 uses to control molecular weight and to retain solubility of the PMR-15 intermediates during consolidation and cure. Lacking the chain terminators, the AVIMIDs can chain-extend to appreciable molecular weights. To achieve these molecular weights, however, the AVIMIDs (and their LaRC cousins) rely on the melting of crystalline powders to retain solubility or, at least, to permit processing. It has proven difficult to use the AVIMIDs in aerospace parts because of their crystalline melt intermediate stage.

Imides and many other resin backbones have shown surprisingly high glass-transition temperatures, reasonable processing parameters and constraints for the prepregs, and desirable physical properties for the composites by using soluble oligomers having difunctional caps, especially those with nadic caps. Linear oligomers of this type include two crosslinking functionalities at each end of the resin chain to promote crosslinking upon curing. Linear oligomers are "monofunctional" when they have one crosslinking functionality at each end. Most formulations for high-temperature polymer-matrix composites (HTMPCs) have monofunctional endcaps with the exception of chemistries that contain dinadic endcaps described in U.S. Pat. No. 5,969,079.

It is known that dinadic- and nadic-endcapped materials react at lower temperatures than phenylethynyl-endcapped materials, which can limit some of the chemistries that are possible for HTPMC formulations because they will react too rapidly at the point of minimum viscosity, thereby reducing the available processing window for fabricating parts where liquid-molding processes such as resin transfer molding, resin film infusion, and vacuum-assisted resin transfer molding are desired.

All currently available phenylethynyl-endcapped materials have monofunctional endcaps. Thus, the degree of crosslinking is limited. It has been shown that difunctional endcaps provide polymers with significantly higher mechanical properties than those with monofunctional endcaps, particularly in aerospace-grade epoxies. It would be desirable to provide phenylethynyl-endcapped materials having this multi-functionality for use in new, more-processable materials suitable for high-temperature composites. To further improve the degree of crosslinking, it would also be desirable to provide polyacetylinic oligomers having multiple ethynyl groups incorporated into the backbone of oligomers.

BRIEF DESCRIPTION OF THE DISCLOSURE

In one aspect, a polyacetylinic oligomer having one or more ethynyl functional groups incorporated into the backbone to enhance crosslinking with itself or with other oligomers. In one embodiment, the polyacetylinic oligomers have the formula:

D-A-D wherein

D is an endcap including at least one crosslinking functionality; and

A is backbone selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone. At least one ethynyl functional group, however, is incorporated into the backbone such that crosslinking is not only realized at the endcaps but also at the ethynyl groups within the backbone of the oligomer itself.

In another aspect, an advanced composite blend is provided. The advanced composite blend includes a polyacetylinic oligomer having the formula:

D-A-D    (5)

wherein

D is an endcap including at least one crosslinking functionality; and

A is a backbone selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone. At least one ethynyl functional group, however, is incorporated into the backbone. The composite blend also includes at least one polymer from a different chemical family than the oligomer.

DETAILED DESCRIPTION OF THE DISCLOSURE

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Polyacetylinic oligomers for use in high-temperature polymer-matrix composites are disclosed below in detail. Polyacetylinic oligomers according to the present invention provide composites with significantly improved mechanical properties and increased stability. Polyacetylinic oligomers according to embodiments of the present invention include one or more ethynl functional groups incorporated into the backbone of the oligomer. That is, the ethynyl functional groups are present in the backbone and preferably are not present as pendant side groups or in pendent chains along the oligomeric backbone. In certain embodiments, however, ethynyl groups can be incorporated into the backbone of the oligomeric backbone and also incorporated into pendant side chains from the oligomeric backbone.

Polyacetylinic oligomers according to embodiments of the present invention can have amine, anhydride, hydroxy, or acid chloride functionality to react with endcaps of various different functionalities. For example, amine-functional backbones can react with anhydride-functional endcaps; acid chloride-functional backbones can react with amine-functional endcaps; etc. Polyacetylinic oligomers according to embodiments of the present invention can be made from several routes, including, for example, starting with brominated compounds as bromines that are reacted with phenylacetylene, using palladium-based catalysts, to replace the bromines with phenylethynyl moieties.

Several commercially available compounds can readily be utilized to incorporate one or more ethynyl functional groups into a variety of suitable oligomeric backbones for high-temperature polymer-matrix composites. For instance, each of the following commercially available compounds can be utilized to introduce or produce an oligomeric backbone according to embodiments of the present invention:

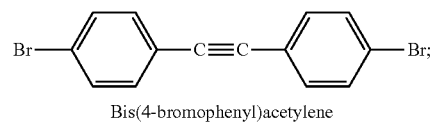

Bis(4-bromophenyl)acetylene

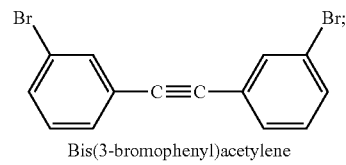

Bis(3-bromophenyl)acetylene

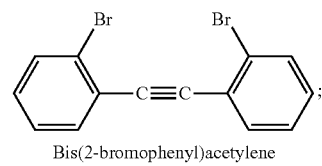

Bis(2-bromophenyl)acetylene

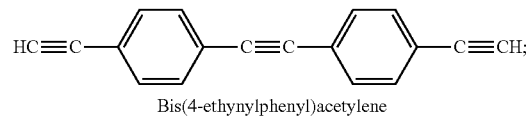

Bis(4-ethynylphenyl)acetylene

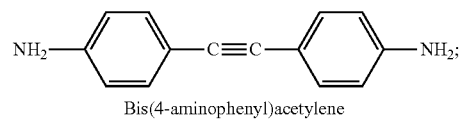

Bis(4-aminophenyl)acetylene

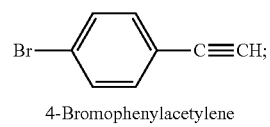

4-Bromophenylacetylene

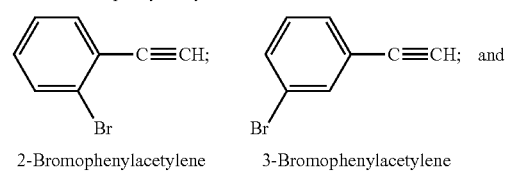

2-Bromophenylacetylene    3-Bromophenylacetylene

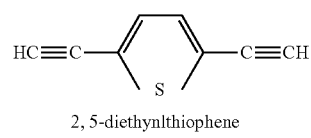

2,5-diethynlthiophene

Such compounds are merely provided as non-exhaustive exemplary list of some (but not all) compounds suitable as building blocks for providing polyacetylinic oligomers according to the present invention.

By way of example, Reaction Scheme I utilizes some of the previously listed commercially available compounds for providing polyacetylinic oligomers having multiple ethynyl functional groups incorporated into the oligomeric backbone according to one embodiment of the present invention.

Reaction Scheme I
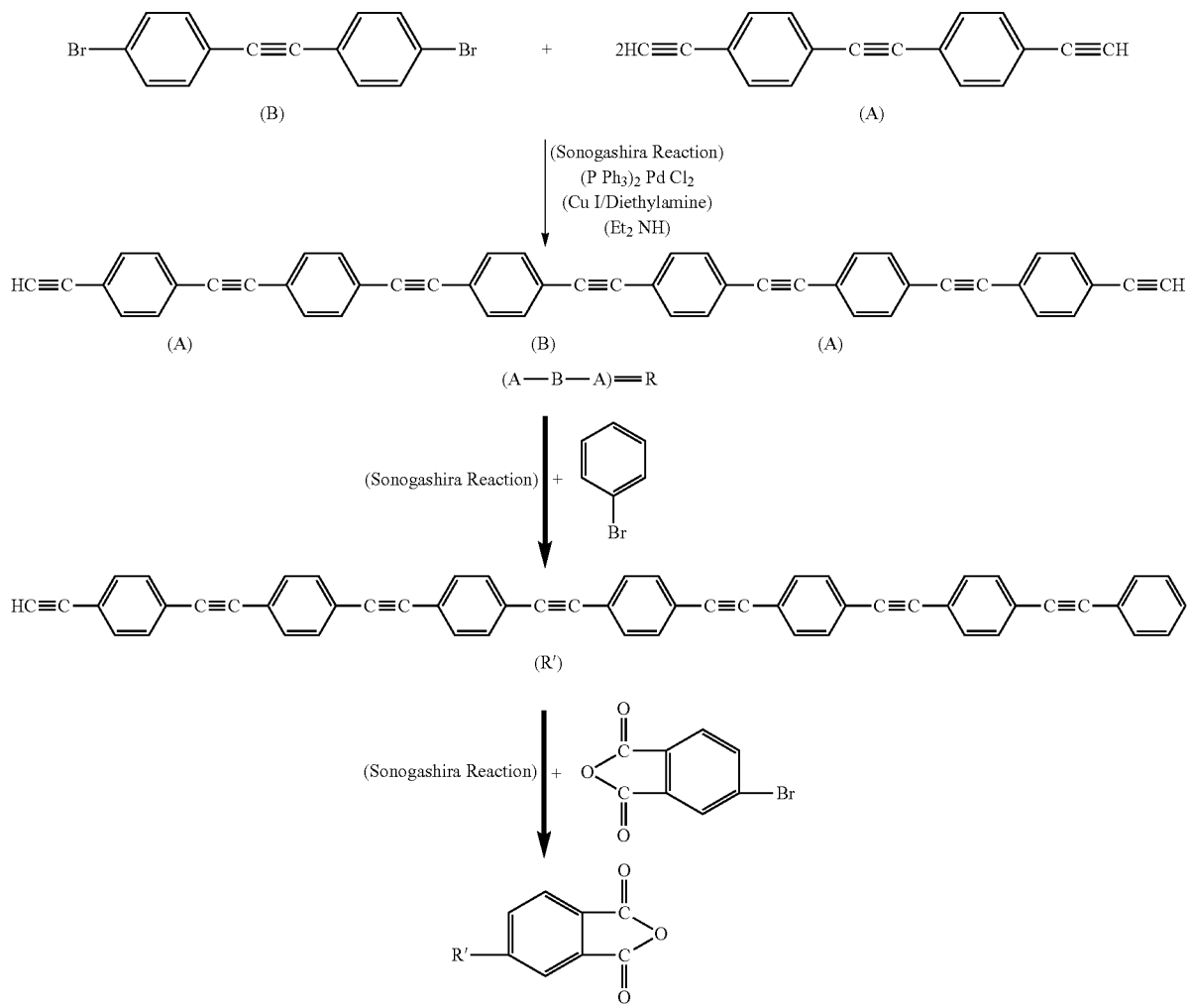
Reaction Scheme II illustrates another example of how polyacetylinic oligomers having multiple ethynyl functional groups incorporated into the oligomeric backbone are provided according to another embodiment of the present invention.
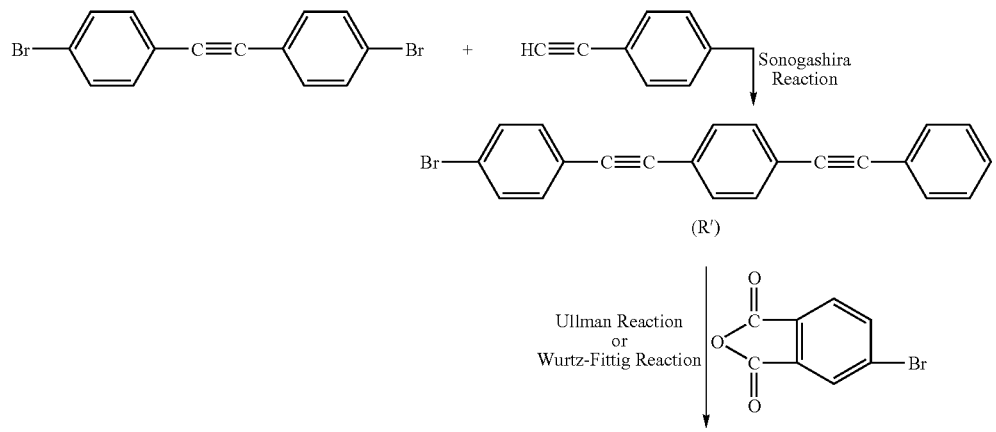

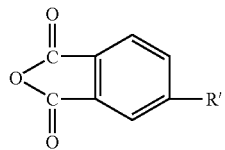

As shown in Reaction Schemes I and II, polyacetylinic oligomers including several ethynyl functional groups incorporated into the backbone of the oligomer can be readily synthesized.

In one exemplary embodiment, blends are used for tailoring the mechanical properties of composites while retaining ease of processing. Advanced composite blends can be mixed chemical blends of a linear or multi-dimensional crosslinking oligomer(s) of one chemical family, such as a heterocycle, and corresponding linear or multidimensional polymer(s), unable to crosslink, from a different chemical family, such as ethersulfone. Generally the polymer has an average formula weight that is initially higher than that of the oligomer, but the formula weight of the oligomeric portion of the blend will increase appreciably during curing through addition (i.e. homo-) polymerization between the crosslinking functionalities. The ratio of oligomer(s) to polymer(s) can be varied to achieve the desired combination of physical properties. Usually the ratio is such that the addition polymer formed during curing constitutes no more than about 50 mol % of the composite. While two component blends are predominately described below, the blends can be more complex mixtures of oligomers or polymers with coreactants, if desired. The blends may even include coreactive oligomers. By oligomer is meant any molecular weight moiety that includes crosslinking functionalities at its ends to allow it to react to increase the effective molecular weight when the oligomer cures to form a composite. By polymer is meant any resin that does not include the crosslinking functionalities of the oligomers.

Advanced composite (mixed chemical) blends of the exemplary embodiment include a mixture of a crosslinking oligomer from one chemical family, generally selected from the group consisting of: imidesulfone; ether; ethersulfone; amide; imide; ester; estersulfone; etherimide; amideimide; oxazole; oxazole sulfone; thiazole; thiazole sulfone; imidazole; and imidazole sulfone, and a noncrosslinking polymer from a different chemical family that act as a toughening agent, plasticizer, and the like. Coreactants may be included in the blends, or they may comprise mixtures of three or more oligomers/polymers. Because the oligomer's average formula weight will appreciably increase upon curing, generally the average formula weight of the polymer in the uncured blend will be greater than that of the oligomer. For example, a linear oligomer may have an average formula weight of about 500-5000 while the corresponding polymer has an average formula weight of about 20,000-40,000. Upon curing, the oligomer and polymer will generally have average formula weights that are closer because of addition polymerization of the oligomer. Therefore, the problems sometimes encountered with blends having components of widely different average formula weight are not as pronounced in composites formed from the advanced composite blends.

Advanced composite blends allow tailoring of the properties of high performance composites. They allow averaging of the properties of resins from different families to provide composites that do not have as severe shortcomings as the pure compounds. For example, the rigid nature of heterocycles (oxazole, thiazole, or imidazole) can be reduced by an advanced composite blend comprising a heterocycle oligomer and an ethersulfone polymer. The resulting composite will have a use temperature (thermo-oxidative stability) higher than pure ethersulfone and a flexibility greater than the pure heterocycle. Accordingly, the resulting composites have a blending or averaging of physical properties, which makes them candidates for particularly harsh conditions.

Suitable oligomer/polymer combinations include, but are not limited to: amideimide/imide; amideimide/imidesulfone; amideimide/heterocycle; amideimide/heterocycle sulfone; imide/heterocycle; imidesulfone/heterocycle; imide/heterocycle sulfone; imide/amide; imidesulfone/amide; ester/amide; estersulfone/amide; ester/imide; ester/imidesulfone; estersulfone/imide; or estersulfone/imidesulfone. In each case the oligomer can be either component in the mixture.

Linear oligomers have the general formula:

D-A-D wherein
A=a hydrocarbon residue, from one of the families previously described above and having an aromatic, aliphatic, or aromatic and aliphatic backbone including one or more ethynyl functional groups therein; and D is an endcap including at least one crosslinking functionality (e.g., a functional group that crosslinks with other oligomer, polymers or with other functional groups on the same oligomer).

The backbone A, is generally individually selected from the group consisting of: imidesulfones; ethersulfones; amides; ethers; esters; estersulfones; imides; etherimides; amideimides; oxazoles; thiazoles; imidazoles, or heterocycle (i.e. oxazole, thiazole imidazole) sulfones; and generally include aromatic (typically phenyl) radicals between linkages, although they may have other aromatic, aliphatic, or aromatic and aliphatic radicals. In particular, certain preferred embodiments according to the present invention include an ethynyl radical between linkages. Although this description will primarily describe para isomers of these backbones, other isomers (particularly meta) can be used. The aromatic radicals in the backbones may also include nonreactive substituents in some cases, such as aryl, lower alkyl, or lower alkoxy.

Oligomers of the general formula D-A-D are prepared by reacting suitable endcap monomers with monomer reactants (polymer precursors) that are commonly used to form the desired backbones and the desired acetylinic monomers for introducing ethynyl functional groups into the oligomeric backbone. For instance, formulations according to embodiments of the present invention can be formed by reacting, for example, amine functional di-phenylethynyl endcaps with 3,3',4,4'-benzophenone tetracarboxylic dianhydride (BTDA) or 2,2'-bis-(3,4-dicarboxyphenyl) hexafluoropropane dianhydride (6FDA); or hydroxyl (OH) functional di-phenylethynyl endcaps with 4,4'-dichlorodiphenyl sulfone or 4,4', dichlorodiphenyl hexafluoropropane; or acid chloride functional di-phenylethynyl endcaps with 4,4'-methylene dianiline (MDA), 3,4'-oxydianiline (ODA), or 1,3-diamino-2,4,5,6-tetrafluorobenzene (DTFBA). Additionally, combinations of different groups within the backbone of the oligomers to impart different chain stiffness (to increase or decrease stiffness for mechanical properties and/or improved processability) may be used without limitation. In one embodiment, molecular weights of the oligomers with diphenylethynyl endcaps are in the range of about 500 to about 5000, and in another embodiment, of about 1000 to about 1500 are used.

By way of example, a variety of oligomers according to certain embodiments of the present invention can be formulated by utilizing some or all of the following compounds:

(A)

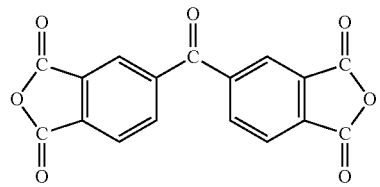

BTDA
(Benzophenone tetracarboxylic dianhydride)

(B)

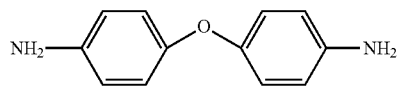

ODA
Oxydianiline (D')

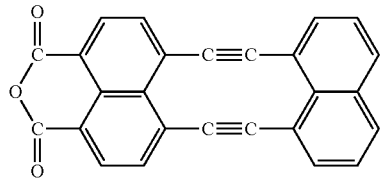

4, 5-Diphenyl acetylene Naphthalic anhydride (E)

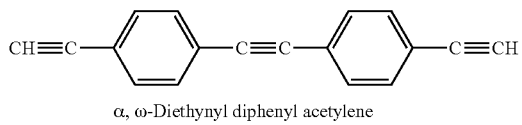

α, ω-Diethynyl diphenyl acetylene (F)

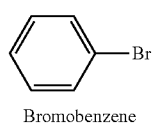

Bromobenzene

In one possible synthetic pathway, BTDA and ODA may be utilized according to the following schematic:

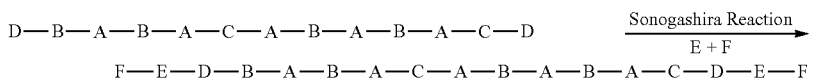

-continued (C)

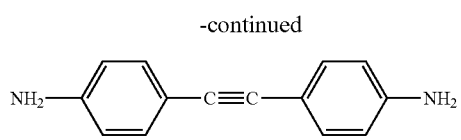

P, P'-Diamino diphenyl acetylene (D)

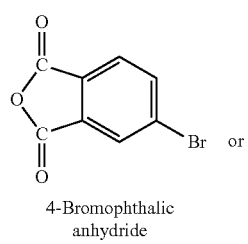

4-Bromophthalic
anhydride

Another possible reaction can provide: D'-B-A-B-D'. In one instance, an ethynyl is present on the backbone; while in the second, a diethynyl terminal group. Beneficially, however, certain embodiments of the present invention include using the first sequence so that the resulting oligomer can have an ethynyl group both in the backbone and at least one end of the oligomer.

According to certain embodiments of the present invention, the acetylenic moiety can be introduced at any point where a bromo-terminated moiety is placed. For example, a terminated bromo compound can be generally obtained, for example, by reacting:

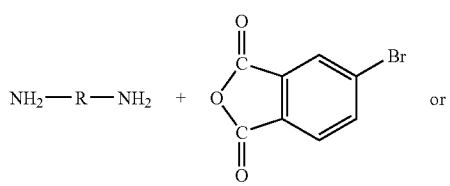

-continued

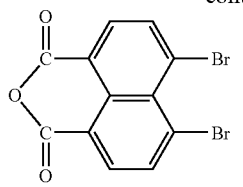

The resulting bromo-terminated compound can then be reacted, for example only, with an phenyl acetylene or polyphenyl acetylene according to the Sonogashira reaction.

As previously stated, polyacetylinic oligomers according to embodiments of the present invention can have amine, anhydride, hydroxy, or acid chloride functionality to react with endcaps of various different functionalities. As such, suitable endcaps according to embodiments of the present invention include nadic and dinadic encaps as well as ethynyl and di-ethynyl encaps among others.

In one embodiment, the endcap monomers are selected from

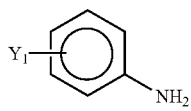

wherein, Y is

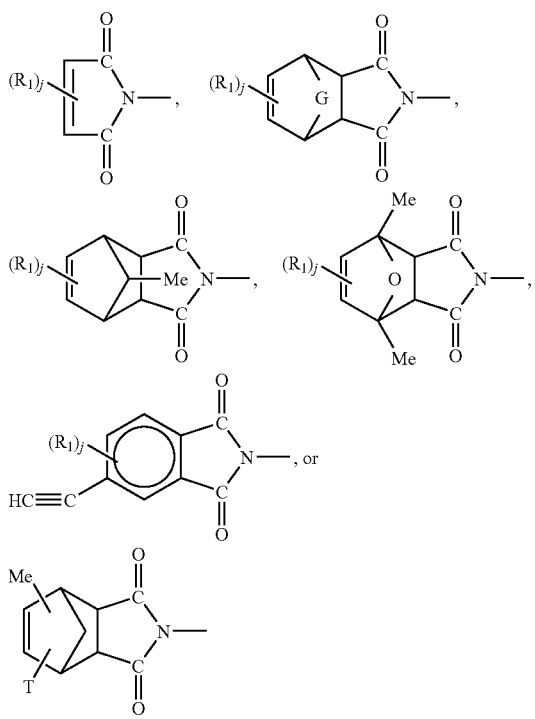

$R_1$=a lower alkyl (e.g., saturated or unsaturated, linear or branched), lower alkoxy, aryl, aryloxy, substituted aryl, substituted alkyl, halogen, or mixtures thereof; Me=methyl; T=allyl or methallyl; i=1 or 2; j=0, 1, or 2; and G=—$CH_2$—, —O—, —S—, or —$SO_2$—.

In another embodiment according to the present invention, the endcap monomers are selected from the formula:

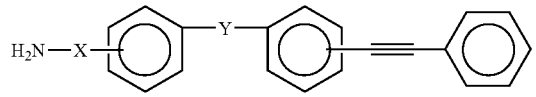

wherein, X is a bond, or a meta or para substituted phenoxy group; and Y is an activating group consisting of $C(CF_3)_2$, CO, O, S, SO, or $SO_2$. In certain embodiments, the polyacetylinic oligomers include endcaps selected from the group consisting of:

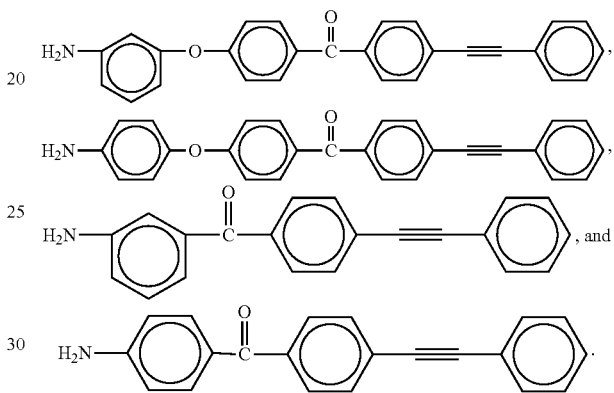

In yet another embodiment according to the present invention, the endcap monomers are selected from the formula:

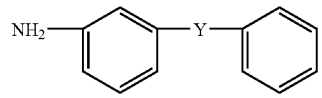

wherein Y is S, SO, $SO_2$, or O.

In certain preferred embodiments, polyacetylinic oligomers include at least one di-phenylethynyl endcap monomer. Preferably, the di-phenylethynyl endcap is selected from the group consisting of:

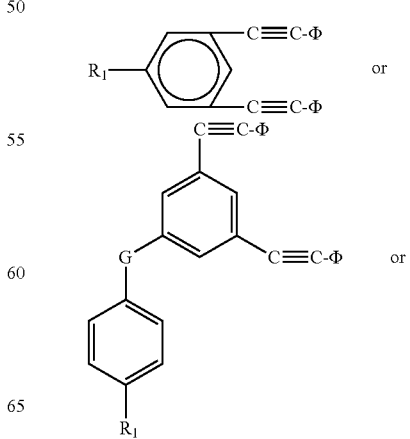

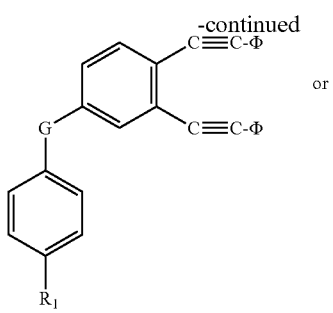

or

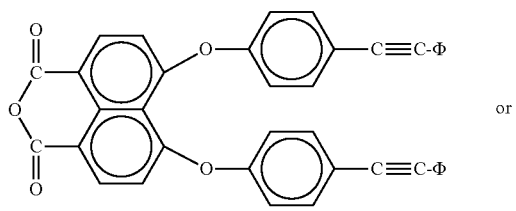

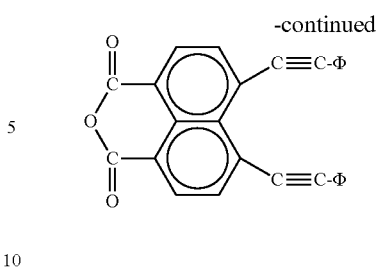

or wherein

Φ=phenyl;

G=—SO$_2$—, —S—, —O—, —CH$_2$—, —CO—, —SO—, C$_3$F$_6$, or NHCO; and

R$_1$=amine, hydroxyl, acid chloride, or anhydride, where R$_1$ is the point of attachment to the oligomeric backbone.

Di-phenylethynyl endcap monomers can be prepared, in one embodiment, by starting with brominated compounds as bromines, which are reacted with phenyl acetylene using palladium-based catalysts to replace the bromines with phenylethynyls. For example, the di-phenylethynyl endcap monomers can be prepared by the following reaction scheme:

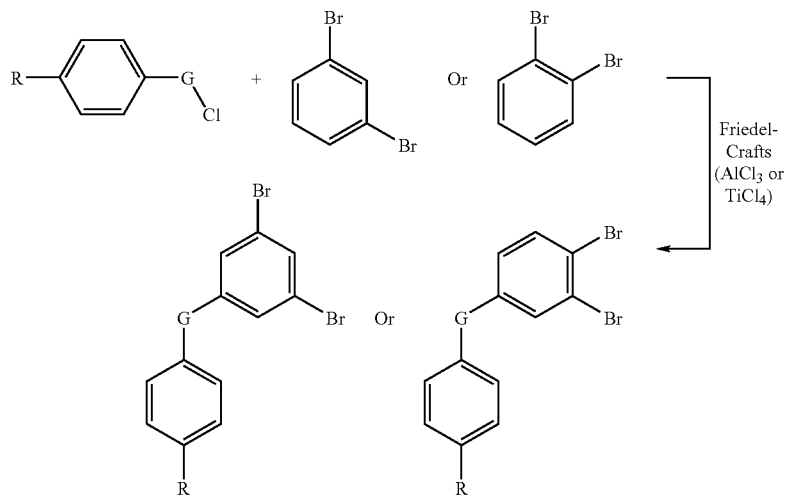

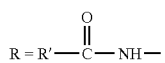

R' = alkyl, aryl, e.g. CH$_3$, and phenyl; and

G = —SO$_2$—, —S—, —O—, —CH$_2$—, —CO—, —SO—, C$_3$F$_6$, or NHCO.

The bromine compounds are then reacted with a phenyl-ethynyl acetylene using a palladium catalyst:

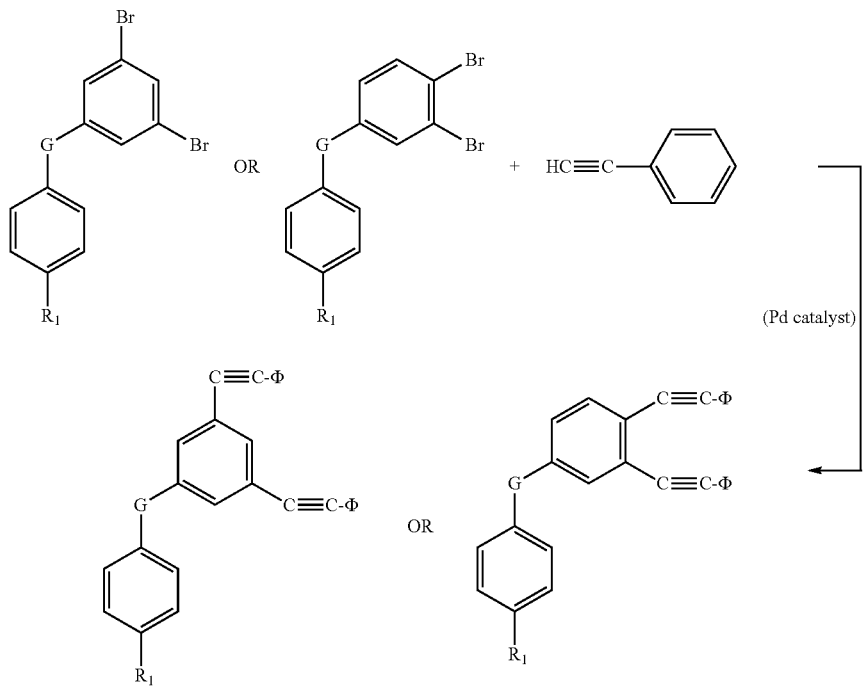

wherein
Φ=phenyl
$R_1$=amine, hydroxyl, acid chloride, or anhydride.

In another embodiment, the following reaction scheme can be used.

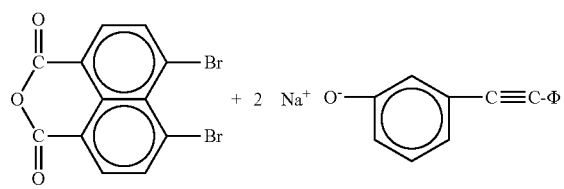

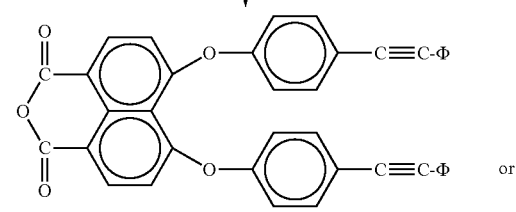

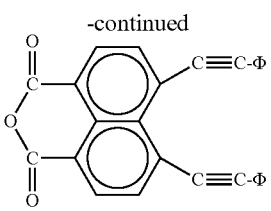

Suitable palladium catalyst to be used for displacement of a halogen atom from an organic moiety with an acetylinic moiety, include, but are not limited to: $Pd/(PPh_3)_2$; $PdCl_2/(PPh_3)_2$; $PdCl_2/CuCl_2/LiCl$; $Pd(OAc)_2/PPh_3/Et_3N$; $Pd/(PPh_3)_4$. Also, palladium-on-carbon (5% Pd/C); (30% Pd/C) or palladium black (pure Pd) can be used. Additionally, PdO or $Pd(OAc)_2$/benzimidazolium salts can be used. In an exemplary embodiment, the palladium catalyst, for example, $Pd/(PPh_3)_2$ or $PdCl_2/(PPh_3)_2$, is used in the presence of a base, for example, triethyethylamine, a Cu(I) salt, and a solvent, for example, a polar solvent, for example, tetrahydrofuran.

The acetylene arylation reaction is run in an inert atmosphere at atmospheric pressure at a temperature of 65-85° C. for varying lengths of time, ranging from 6-48 hours, depending on the particular aryl bromide used in the reaction. The time and temperature required is dependent on the nature and position of other substituents on the aromatic nucleus of the aryl bromide.

Triethylamine serves as both a solvent and scavenger for the hydrogen bromide generated during the reaction. Other useful amines which can be used in place of triethylamine are, for example, diethylamine, butylamines, pyridine and the like.

A co-solvent such as toluene, xylene, dimethylformamide, or dimethylacetamide can also be used to improve the solubility of the reactants and/or product. The reaction requires the presence of a homogenous palladium catalyst which, for example, can be bis(triphenylphosphine) palladium (II) chloride or tetrakis (triphenylphosphine) palladium (O). To improve the utility of the palladium catalyst, an excess of the phosphine ligand is used. Examples of such phosphine ligands include: triorthotoluoylphosphine and triphenylphosphine which is preferred because of its availability and cost. The use of palladium complexes to catalyze reactions of this type is described in the literature, for example, F. R. Heck and H. A. Dieck, J. Organometallic Chem., 93, p. 259-263 (1975). To further facilitate the reaction a co-catalyst may also be used.

Suitable co-catalysts include cuprous salts, for example, cuprous chloride, cuprous bromide, and cuprous iodide which is preferred. The reaction is monitored by gas or thin-layer chromatography, monitoring the disappearance of reactants and/or appearance of product.

The following example illustrates one approach for preparing the compounds which are representative of the many phenylethynyl compounds which are used as end-capping reactants and will more fully illustrate the embodiments of this invention.

A multi-necked round-bottom flask fitted with a mechanical stirrer, reflux condenser, and thermometer was flushed and maintained under positive pressure of nitrogen. The flask was charged with 356 g (1.0 mol) of 4,5-dibromo-1,8-naphthalic anhydride, 1 liter of dried, degassed triethylamine 215.2 g (2.10 mol) of phenylacetylene, 0.80 g (1.01 mmol) of bis-triphenylphosphine palladium II chloride, 3.7 g (14.1 mmol) of triphenylphosphine, and 0.15 g (0.79 mmol) of cuprous iodide. The system is brought to mild reflux and maintained at that temperature overnight.

The following morning thin-layer chromatography showed only a trace presence of the dibromonaphthalic anhydride. The reaction mixture was cooled to room temperature followed by the addition of 350 ml of ether. The triethylamine hydrobromide byproduct was removed by filtration. The filtrate was concentrated on the rotary evaporator, to give the diphenylethynyl derivative of the 1,8-naphthalic anhydride.

The synthesis of oligomers according to embodiments of the present invention and the representative classes of reactants are presented in greater detail. Amideimides are characterized by backbones of two general types, namely:

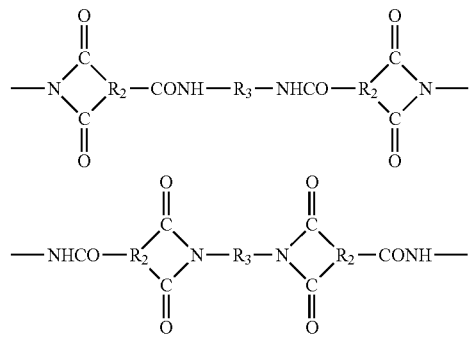

wherein
  $R_3$=an aromatic, aliphatic (e.g., linear, branched, saturated, or unsaturated), heterocyclic (e.g., pyridyl, thiophene, furan, etc.), or alicyclic radical, including an ethynyl functional group; and
  $R_2$=an organic moiety, for example, phenyl or naphthyl.

By way of example, $R_3$ according to one embodiment can be:

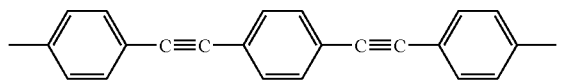

Such a compound can be derived as follows:

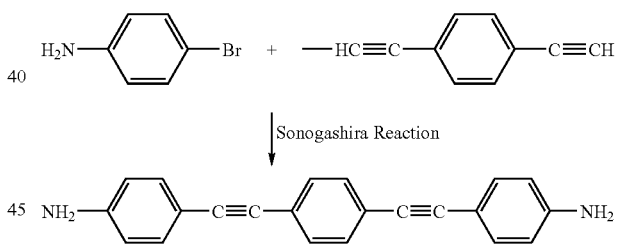

Accordingly, linear polyamideimides include oligomers of the general formula:

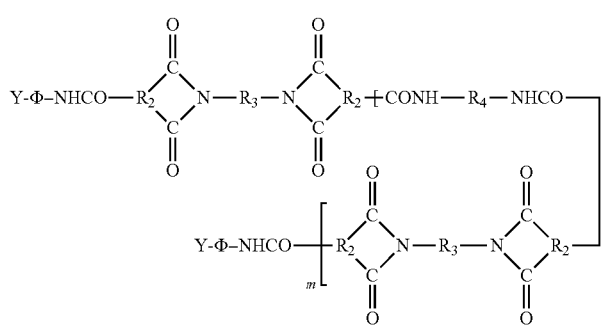

(a)

-continued

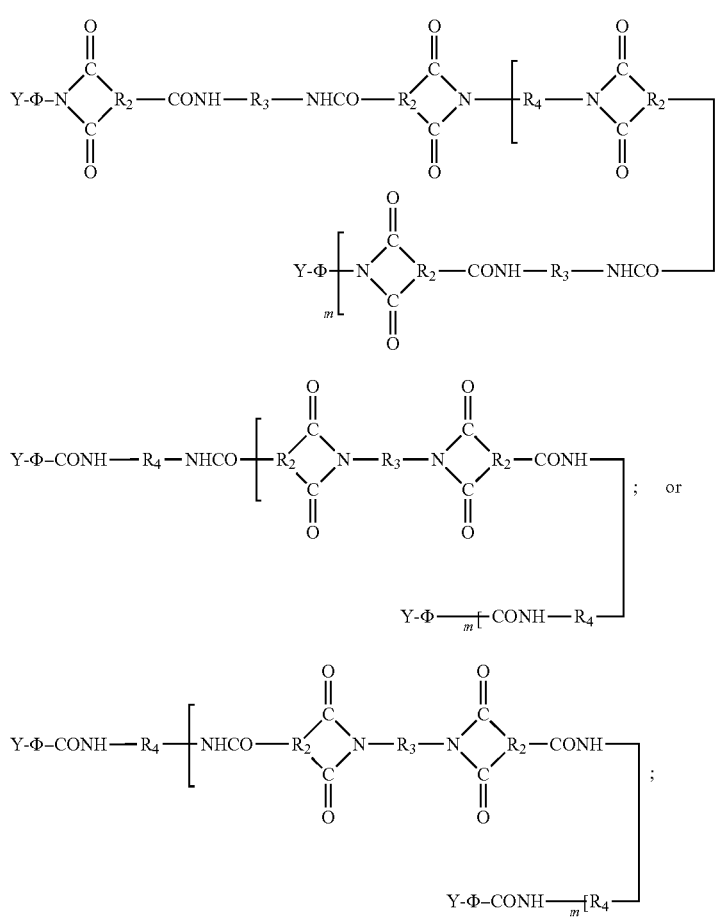

wherein
- Y=an endcap having at least one crosslinking functional group (e.g., di-phenylethnyl endcap residue as described above);
- $R_2$=a trivalent organic radical, for example, phenyl;
- $R_3$=an aromatic, aliphatic (e.g., linear, branched, saturated, or unsaturated), heterocyclic (e.g., pyridyl, thiophene, furan, etc.), or alicyclic radical, including an ethynyl functional group;
- $R_4$=a divalent organic radical that can include an ethynyl group;
- m=a small integer, usually from 0-5, but generally sufficiently large to impart thermoplastic properties in the oligomer; and
- Φ=phenyl.

The amideimides can generally made by condensing suitable endcap monomers, diacid halides, diamines, dianhydrides, and acetylene containing monomer. In certain embodiments according to the present invention, the ethynyl groups will be incorporated into the diamine (e.g., P,P'-diamino diphenyl acetylene). The dianhydrides can be prepared by condensing 2 moles of an acid halide anhydride of the formula:

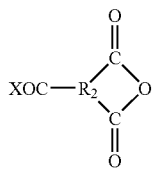

wherein $R_2$ is defined above and X is a halogen;
with a diamine of the formula: $H_2N-R_3-NH_2$. The diamine, in this case, can be selected from any of the following diamines. In addition, isomers other than the para diamines shown below may be used, for example 1, 3; 3,3'; and 3,4.

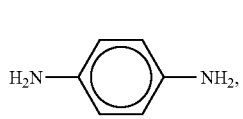 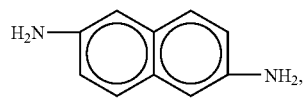 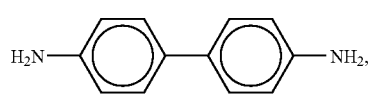

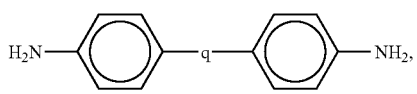
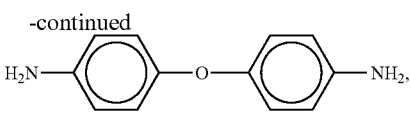

-continued

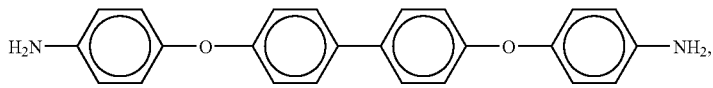

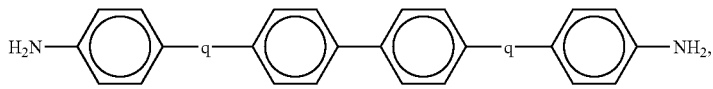

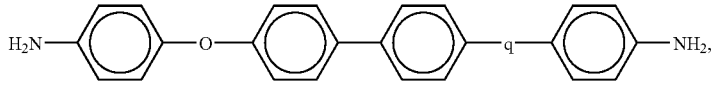

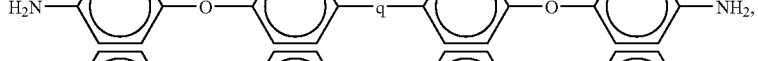

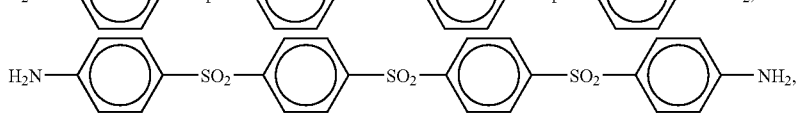

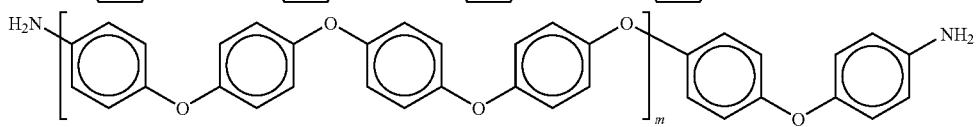

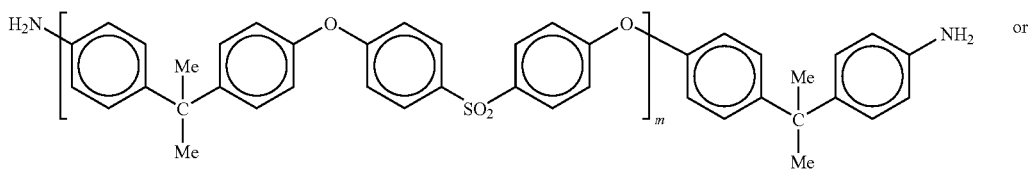

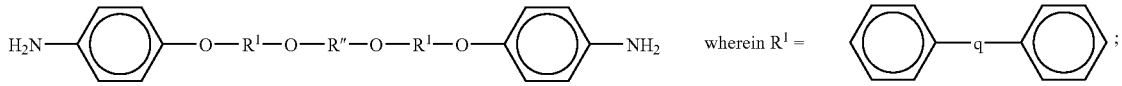

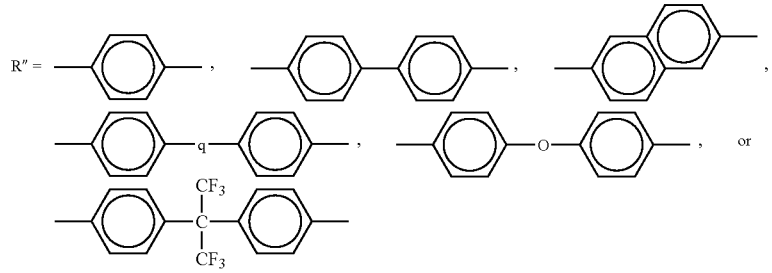

q=an ethynyl functional group, —$SO_2$—, —SO—, —S—, —O—, —CO—, and —$(CF_3)_2C$—;

Me=methyl; and m=a small integer, usually from 0 to 5, but generally sufficiently large to impart thermoplastic properties in the oligomer.

Other diamines that may be used, including those described in U.S. Pat. Nos. 4,504,632; 4,058,505; 4,576,857; 4,251,417; and 4,215,418, the entire contents of which are incorporated herein by reference for all relevant and consistent purposes. The aryl or polyaryl "sulfone" diamines previously described can be used, because these diamines are soluble in conventional synthetic solvents and provide high thermal stability to the resulting oligomers and composites. Diamines may include "Schiff base" conductive linkages (particularly —N=CH—), analogous to diacid halides which will be described.

Ethersulfone (i.e. phenoxyphenyl sulfone) diamines are those in which $R^1$ is and R" is

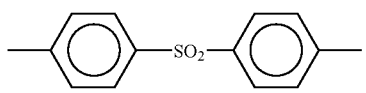

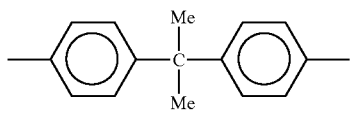

so that the phenoxyphenyl sulfone diamines include:

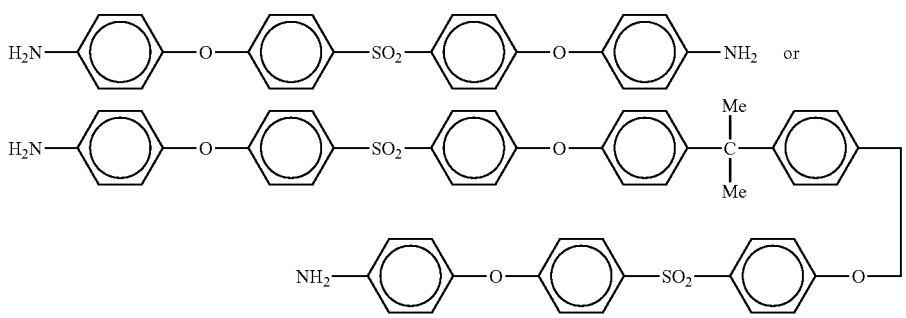

The molecular weights of these diamines varies from about 500 to about 2000. Using lower molecular weight diamines seems to enhance the mechanical properties of the difunctional polyamideimide oligomers, each of which has alternating ether "sulfone" segments in the backbone.

Phenoxyphenyl sulfone diamines of this general nature can be prepared by reacting two moles of aminophenol with (n+1) moles of an aryl radical having terminal, reactive halo-functional groups (dihalogens), such as 4,4'-dichlorodiphenylsulfone, and a suitable bisphenol (i.e., dialcohol, dihydric phenol, or diol). The bisphenol is selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;

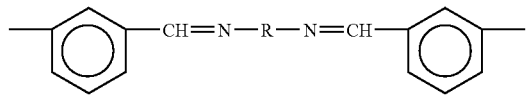

where R can include an ethynyl group, or 2,2-bis-(3-bromo-4-hydroxyphenyl)-propane; or mixtures thereof. Bisphenols having aromatic character (i.e., absence of aliphatic segments), such as bisphenol-A, are used in one embodiment).

The dihalogens according to certain embodiments are selected from the group consisting of:

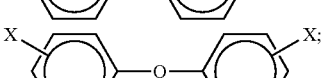
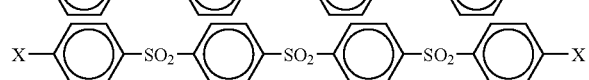

wherein
X=halogen; and
q=an ethynyl functional group, —SO$_2$—, —SO—, —S—, —CO—, or —(CF$_3$)$_2$C—.

The condensation reaction creates ether diamines that ordinarily include intermediate "sulfone" linkages. The condensation generally occurs through a phenate mechanism in the presence of K$_2$CO$_3$ or another base in a DMSO/toluene solvent. The grain size of the K$_2$CO$_3$(s) should fall within the 100-250 ANSI mesh range. Additional methods for preparing phenoxyphenysulfones of this general type are disclosed in U.S. Pat. Nos. 3,839,287 and 3,988,374, the entire contents of which are incorporated herein by reference for all relevant and consistent purposes.

The diacid halide or dicarboxylic acid (i.e. dibasic acid) according to embodiments of the present invention can include an aromatic chain segment selected from the group consisting of:
(a) phenyl; (b) naphthyl; (c) biphenyl;
(d) a polyaryl "sulfone" divalent radical;
(e) a divalent radical illustrated by Schiff base compounds selected from the group consisting of:

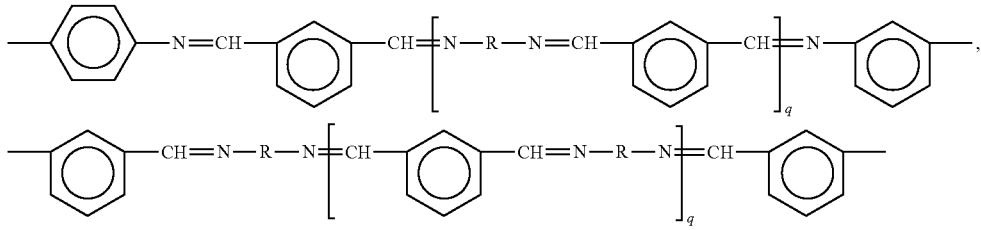

wherein R is selected from the group consisting of: phenyl; biphenyl; naphthyl; or a divalent radical of the general formula:

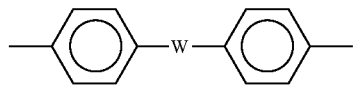

wherein W=an ethynyl functional group, —$SO_2$— or —$CH_2$—; and q=0-4; or
(f) a divalent radical of the general formula:

wherein $R^1$=a $C_2$ to $C_{12}$ divalent aliphatic (e.g., linear, branched, saturated, or unsaturated), alicyclic, or aromatic radical, for example, phenyl.

Thiazole, oxazole, pyridyl, thiophene, furan, or imidazole linkages, especially between aryl groups, may also be used as the conductive linkages to form the conductive or semiconductive oligomers. The diacid halides include:

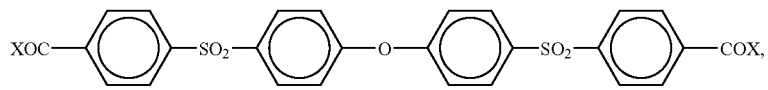

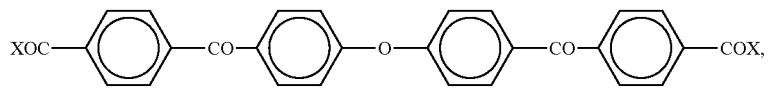

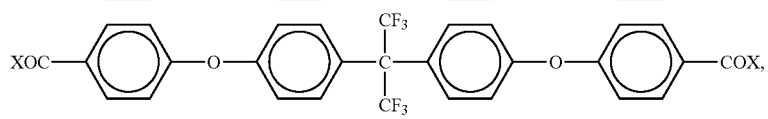

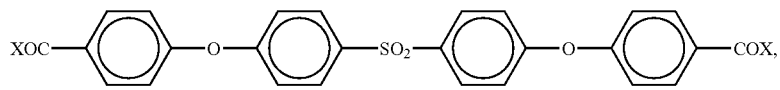

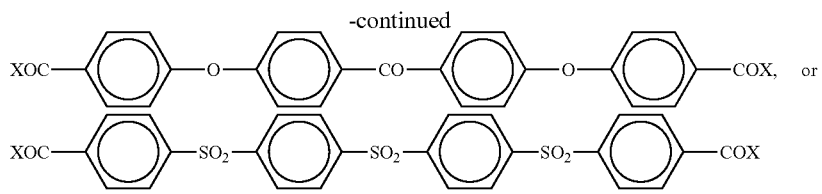

Wherein X=halogen.

Schiff base dicarboxylic acids and diacid halides can be prepared by the condensation of aldehydes and aminobenzoic acid (or other amine acids) in the general reaction scheme:

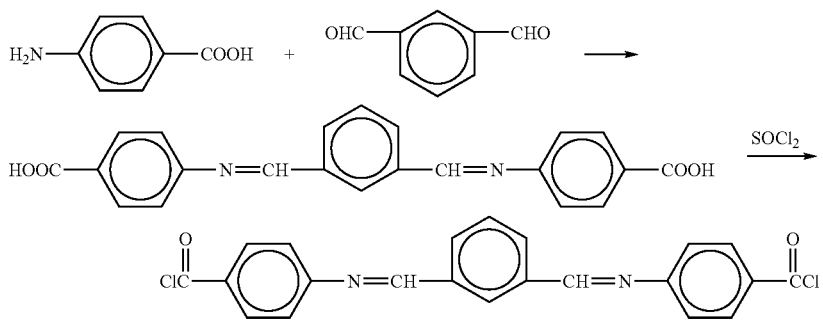

or similar syntheses.

Polyaryl or aryl diacid halides can achieve the high thermal stabilities in the resulting oligomers and composites insofar as aliphatic bonds are not as thermally stable as aromatic bonds. Particularly, compounds can include intermediate electronegative (i.e., "sulfone") linkages, for example, —SO$_2$—, —SO—, —S—, —CO—, and —(CF$_3$)$_2$C— linkages, to improve toughness of the resulting oligomers.

The corresponding amideimide having the backbone:

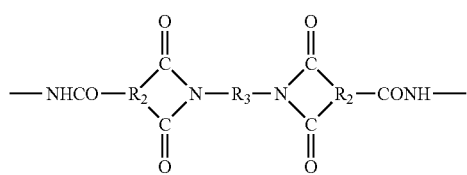

can be prepared if the acid anhydride:

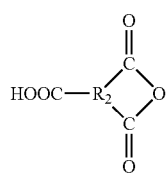

is used instead of the acid halide anhydride. The resulting intermediate products are dicarboxylic acids rather than dianhydrides. These dicarboxylic acids (or their diacid halides) can be used with the diamines previously described.

Dianhydrides useful for the synthesis of amideimides also include:
(a) pyromellitic dianhydride,
(b) benzophenonetetracarboxylic dianhydride (BTDA), and
(c) 5-(2,5-diketotetrahydrofuryl)-3-methylcyclohexene-1,2-dicarboxylic anhydride (MCTC), and may be any aromatic or aliphatic dianhydride, such as those disclosed in U.S. Pat. Nos. 3,933,862; 4,504,632; 4,577,034; 4,197,397; 4,251,417; 4,251,418; or 4,251,420, the entire contents of which are incorporated herein by reference for all relevant and consistent purposes. Mixtures of dianhydrides can be used.

The dianhydrides can also include those intermediates resulting from the condensation of the acid halide anhydride with any of the diamines previously described. Similarly, the dicarboxylic acids and diacid halides include those intermediates prepared by the condensation of the acid anhydride with any of the diamines previously described. The corresponding dicarboxylic acid is converted to the diacid halide (i.e. chloride) in the presence of SOCl$_2$ (i.e. thionyl chloride).

Amideimides can be synthesized by several schemes, as previously described. To obtain repeating units of the general formula:

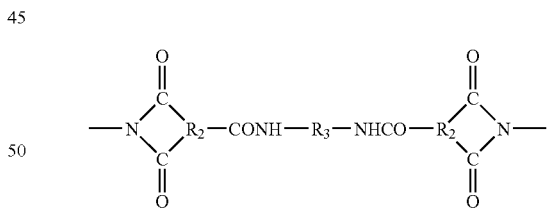

an acid halide anhydride, particularly

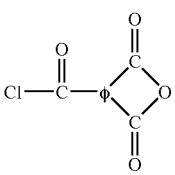

can be mixed with a diamine and with an amine functional endcap in the ratio of n:n:2 wherein n, is an integer greater than or equal to 1. In this reaction, the acid halide anhydride will react with the diamine to form an intermediate dianhydride which will condense with the diamine and amine-functional endcap. The reaction may be carried out in two distinct stages under which the dianhydride is first prepared by mixing substantially stoichiometric amounts (or excess diamine) of the acid halide anhydride and diamine followed by the addition of a mixture of more diamine and the endcap. The diamine used to form the dianhydride may differ from that used in the second stage of the reaction, or it may be a mixture of diamines from the outset.

The related amideimide having repeating units of the general formula:

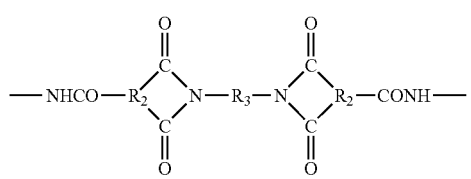

can be synthesized by reacting the acid anhydride with the diamine to form intermediate dicarboxylic acids, which can then react with more diamine or an amine-functional endcap to complete the oligomer. The reaction can be separated into steps.

The amideimide oligomers (as with all oligomers) appear to possess greater solvent resistance if the condensation of the dianhydride/dicarboxylic acid with the diamine and endcap is done simultaneously rather than sequentially.

While use of an amine-functional endcap has been described above, corresponding oligomers can be formed by using an acid halide-functional endcap, if the diamine is provided in excess. In this case the reaction mixture generally comprises the acid halide anhydride or the acid anhydride, the endcap, and the diamine and the synthesis is completed generally in one step.

Reactions are typically conducted under an inert atmosphere and at elevated temperatures, if the reaction rate needs to be increased. The reaction mixture should be well stirred throughout the synthesis. Chilling the reaction mixture can slow the reaction rate and can assist in controlling the oligomeric product.

In one embodiment, the diamine can be in the form of its precursor OCN—R—NCO, if desired. The amideimides described in U.S. Pat. Nos. 4,599,383; 3,988,374; 4,628,079; 3,658,938; and 4,574,144, the entire contents of which are incorporated herein by reference for all relevant and consistent purposes, can be capped with crosslinking monomers to convert the polymers to oligomers that are suitable for forming advanced composite blends.

Polyetherimides and polysulfoneimides are capped to form oligomers that are suitable for use in the coreactive oligomer blends. Compounds have the general formula:

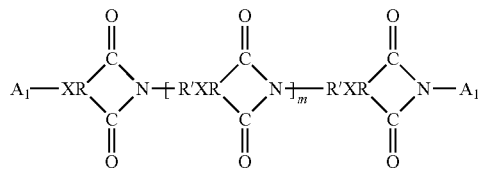

wherein
X=—O—, or —S—;
$A_1$=an endcap including at least one functional group capable of crosslinking such as

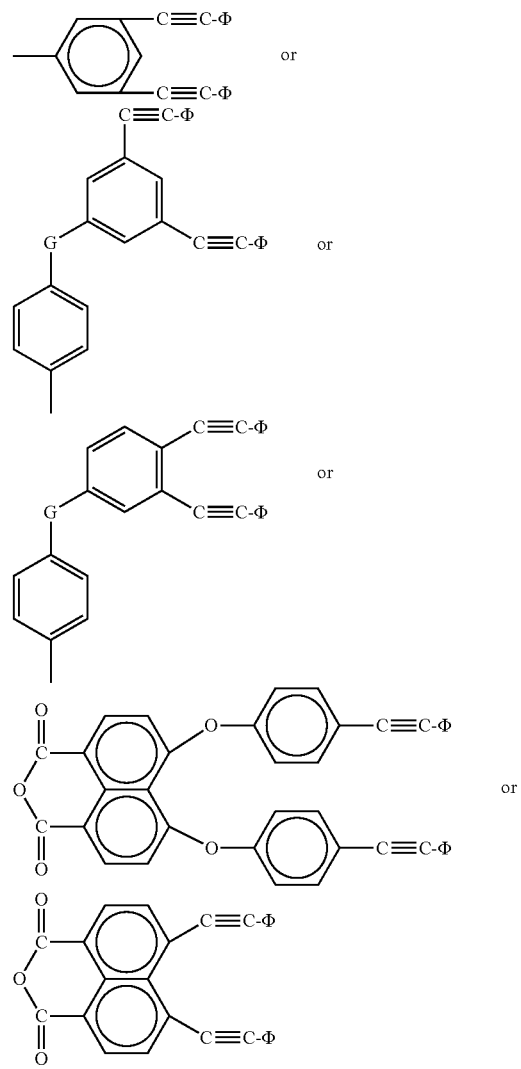

m=is a small integer, usually 1 to 4;
Φ=phenyl;
G=—SO$_2$—, —SO—, —S—, —O—, —CH$_2$—, —CO—, —SO—, C$_3$F$_6$, or NHCO;
R=a trivalent C$_{(6-13)}$ aromatic organic radical; and
R'=a divalent C$_{(6-30)}$ aromatic or ethynyl radical.

The polyetherimide oligomers can be prepared by several reaction schemes. One such method comprises the simultaneous condensation of:

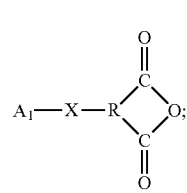

(I)

-continued

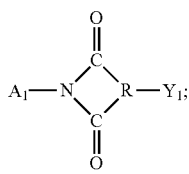
(II)

$Y_1-R\begin{smallmatrix}C\\C\end{smallmatrix}O$; and
(III)

$H_2N-R'-X-H$
(IV)

in the ratio of I:II:III:IV=1:1:m:m+1, wherein m is an integer greater than or equal to one, and $Y_1$=halo- or nitro-. The product has the general formula previously described. The reaction occurs in a suitable solvent under an inert atmosphere. If necessary, the reaction mixture can be heated to facilitate the reaction. The reaction conditions are generally comparable to those described in U.S. Pat. Nos. 3,847,869 and 4,107,147, the entire contents of which are incorporated herein by reference for all relevant and consistent purposes.

Alternatively, the polyetherimides can be prepared by reacting a polyetherimide polymer made by the self-condensation of a phthalimide salt derivative of the formula:

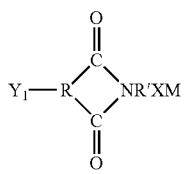

with crosslinking endcap moieties of the formula:

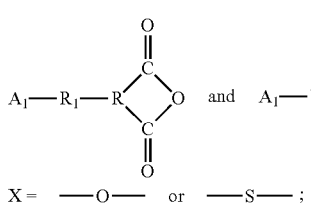

X= —O— or —S—;

$A_1 =$ 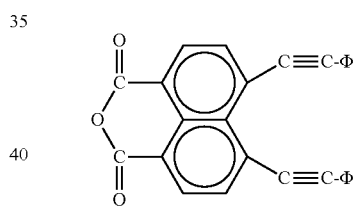 or

-continued

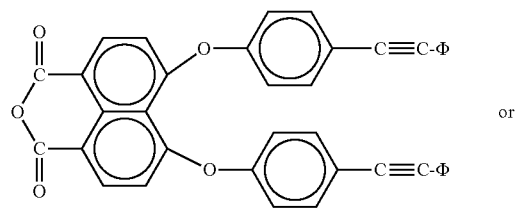

Φ=phenyl;
$Y_1$=halo- or nitro-;
G= —SO$_2$—, —S—, —O—, —CH$_2$—, —CO—, —SO—, C$_3$F$_6$, or NHCO;
$R_1$=amide, imide, or sulfone;
R'=a divalent C$_{(6-30)}$ aromatic or ethynyl radical; and
M=an alkali metal ion or ammonium salt.

The self-condensation proceeds as described in U.S. Pat. No. 4,297,474 in a dipolar aprotic solvent. The endcap moieties can be introduced during the self-condensation to quench the polymerization, or they might be added following completion of the polymerization and recovery of the polyetherimide polymer from methanol. Improved solvent resistance in the cured composites is best achieved, however, by the quenching sequence rather than by the capping sequence which follows polymerization.

Another method for synthesizing polyetherimides involves the simultaneous condensation of about 2 m+2 moles of nitrophthalic anhydride with about m+1 moles of diamine, about m moles of dialcohol (i.e., bisphenol, diol, or dihydric phenol), and 2 moles of $A_1$, having —OH functionality, in a suitable solvent under an inert atmosphere. Here, the dialcohol may be in the form of a phenate.

In this reaction, the diamines (which can have aromatic ethersulfone backbones) react with the anhydride to form intermediates of the following nature in the backbone:

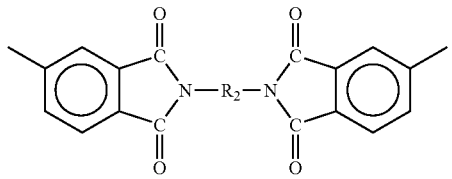

wherein $R_2$ is a residue of the diamine. Similarly, the dialcohol reacts with the nitro-functionality to form an ether linkage of the general formula:

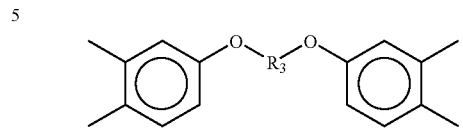

wherein $R_3$ is a residue of the dialcohol. The $A_1$, having —OH functionality, endcaps quench the polymerization. The resulting polyetherimides have the general formula:

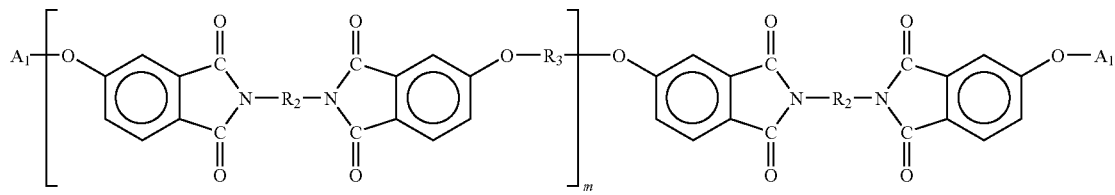

Another synthesis includes the simultaneous condensation of about 2 m+2 moles of nitrophthalic anhydride with about m+1 moles of dialcohol, m moles of diamine, and 2 moles $A_1$, having —$NH_2$ functionality, in a suitable solvent under an inert atmosphere. Again, the dialcohol may be in the phenate form. The resulting oligomer has a general formula:

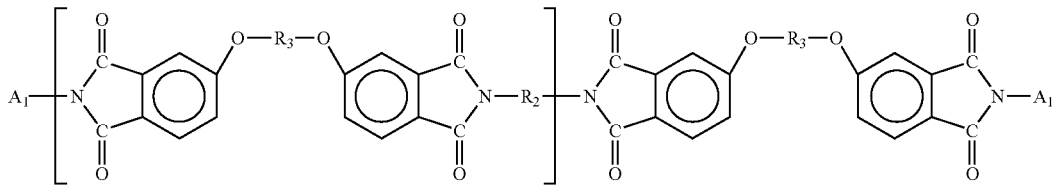

Another synthesis includes the simultaneous condensation of 2 m moles of nitrophthalic anhydride with about m+1 moles of dialcohol, m moles of diamine, and 2 moles of $A_1$, having —$NO_2$ functionality, in a suitable solvent under an inert atmosphere. The dialcohol may be in the phenate form or a corresponding sulfhydryl(thio) can be used to form a thioether. The resulting oligomer has the general formula:

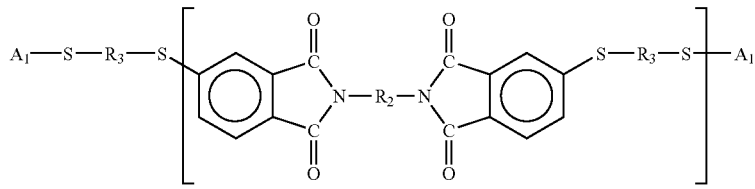

In any of the syntheses, the dialcohol can be replaced by a comparable disulfhydryl of the formula: HS—R$_2$—SH. Mixtures of dialcohols, or disulfhydryls can be used.

Although the bisphenols previously described can be used, for etherimides, the dialcohol is generally a polyaryl compound and preferably is selected from the group consisting of:
HO—Ar—OH;
HO—Ar-L-Ar'-L-Ar—OH
HO—Ar'-L-Ar-L-Ar'—OH
wherein
L=—C$_2$— (e.g., ethenyl, ethylene, or ethynyl), —CH$_2$—, —(CH$_3$)$_2$C—, —(CF$_3$)$_2$C—, —O—, —S—, —SO$_2$—, or —CO—;

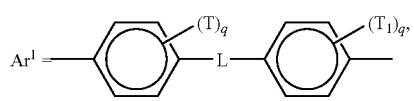

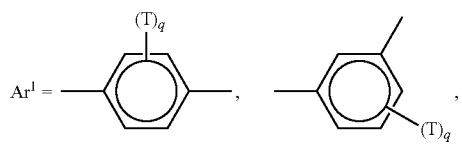

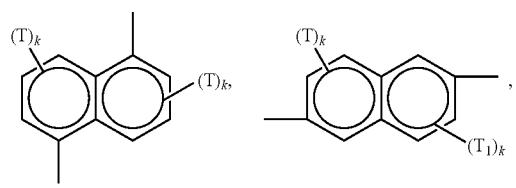

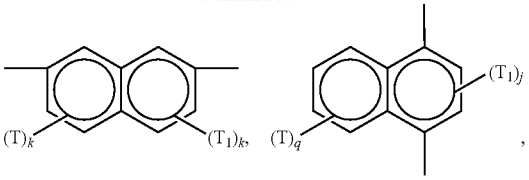

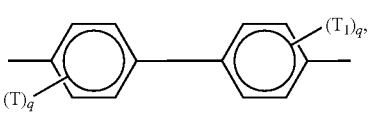

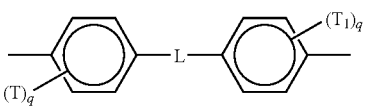

T and T$_1$=lower alkyl (e.g., linear, branched, saturated, or unsaturated), lower alkoxy, aryl, aryloxy, substituted alkyl, substituted aryl, halogen, or mixtures thereof;

q=0-4; and k=0-3.

The dialcohols also include hydroquinone; bisphenol-A; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; a dialcohol having a Schiff base segment, the radical being selected from the group consisting of:

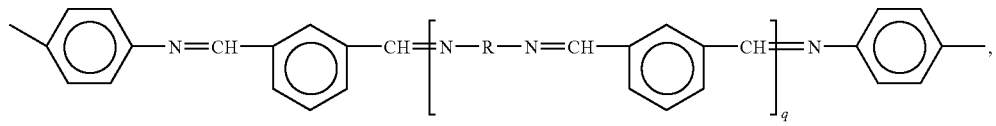

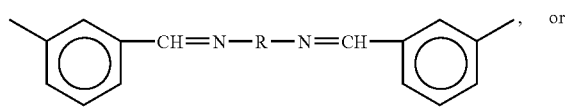

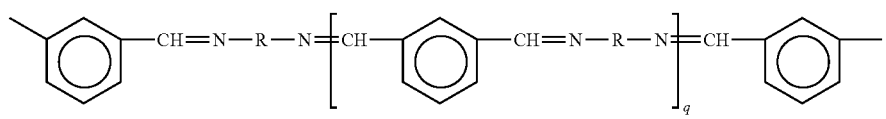

wherein R is selected from the group consisting of: phenyl; biphenyl; naphthyl; or a radical of the general formula:

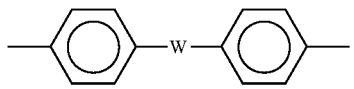

wherein
W=—C$_2$—, —CH$_2$—, —SO—, —S—, —SO$_2$—, or —O—;
or a dialcohol selected from the group:

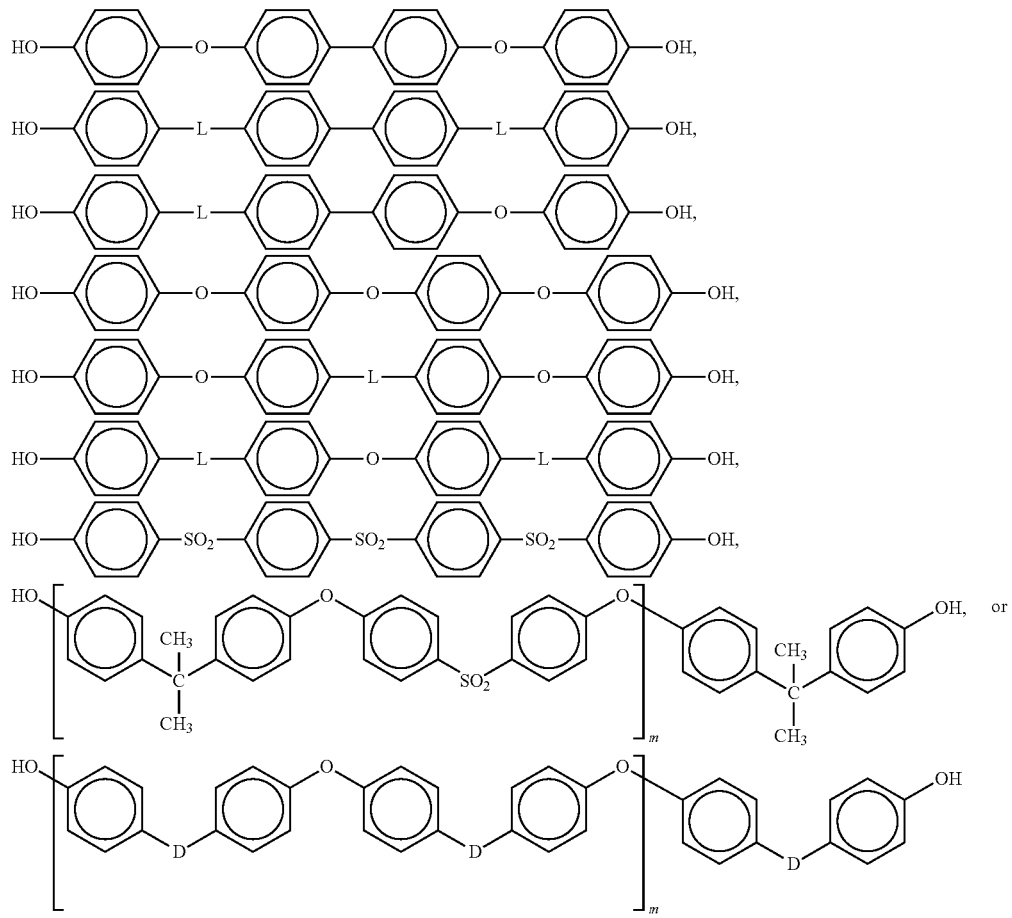

wherein
 L is as previously defined;
 m=an integer, generally less than 5, and preferably 0 or 1; and
 D=any of —CO—, —SO$_2$—, —SO—, —S—, —O—, or —(CF$_3$)$_2$C—.

While bisphenol-A is used in the etherimide synthesis, the other dialcohols can be used to add rigidity to the oligomer without significantly increasing the average formula weight, and, therefore, can increase the solvent resistance. Random or block copolymers are possible.

Furthermore, the dialcohols may also be selected from those described in U.S. Pat. Nos. 4,584,364; 3,262,914; or 4,611,048. The hydroxy-terminated etherimides of U.S. Pat. No. 4,611,048 can be reacted with A$_1$, having —NO$_2$ functionality, to provide crosslinking etherimides of the present invention.

Dialcohols of this nature are commercially available. Some may be easily synthesized by reacting halide intermediates with bis-phenates, such as by the reaction of 4,4'-dichlorodiphenylsulfone with bis(disodium biphenolate).

The oligomers can be synthesized in a homogeneous reaction scheme wherein all the reactants are mixed at one time (and this scheme is preferred in certain embodiments), or in a stepwise reaction. The diamine and dialcohols can be mixed, for example, followed by addition of the nitrophthalic anhydride to initiate the polymerization and thereafter the endcaps to quench it. In certain embodiments, acetylenic monomers can also be added into the homogeneous reaction scheme.

Those skilled in the art will recognize the different methods that might be used. To the extent possible, undesirable competitive reactions should be minimized by controlling the reaction steps (i.e., addition of reactants) and the reaction conditions.

Suitable diamines include those diamines described with reference to the amideimide synthesis.

Anhydrides of the formula:

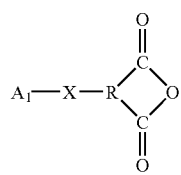

wherein

X=—O— or —S—;

R=a trivalent $C_{(6-13)}$ aromatic organic radical;

$A_1$=nadic, dinadic, or

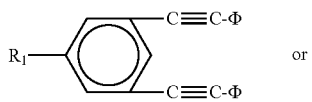 or

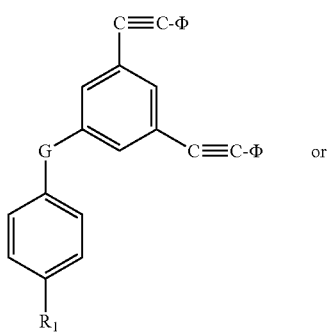 or

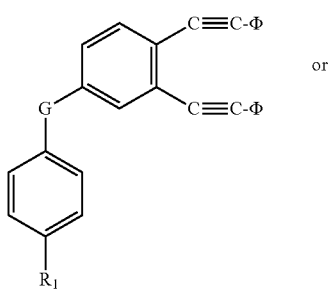 or

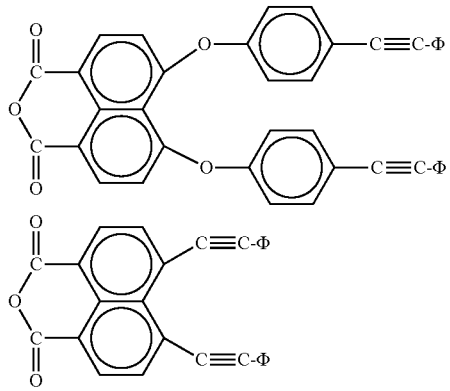 or

Φ=phenyl;

G=—SO₂—, —S—, —O—, —CH₂—, —CO—, —SO—, $C_3F_6$, or NHCO; and $R_1$—amine, hydroxyl, acid chloride, or anhydride, are useful in the synthesis of etherimides, and are prepared by the condensation of the corresponding endcap phenol or thiol (—XH) with a nitro- or halo-anhydride that contains the R moiety.

In at least one synthesis of the etherimides, a compound of the formula:

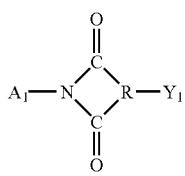

is an intermediate or reactant, wherein:

R=a trivalent $C_{(6-13)}$ aromatic organic radical;

$A_1$=a nadic, dinadic, or

Φ=phenyl;

G=—SO₂—, —S—, —O—, —CH₂—, —CO—, —SO—, $C_3F_6$, or NHCO;

$R_1$—amine, hydroxyl, acid chloride, or anhydride;

$Y_1$=halo or nitro.

This intermediate is formed by reacting $A_1$, having —$NH_2$ functionality, with a substituted phthalic anhydride of the formula:

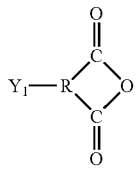

These substituted anhydrides are described in U.S. Pat. Nos. 4,297,474 and 3,847,869, the entire contents of which are incorporated herein by reference for all relevant and consistent purposes.

Polysulfoneimide oligomers corresponding to the etherimides can be prepared by reacting about m+1 moles of a dianhydride with about m moles of a diamine and about 2 moles of an amine functional endcap ($A_1$-$NH_2$). The resulting oligomer has the general formula:

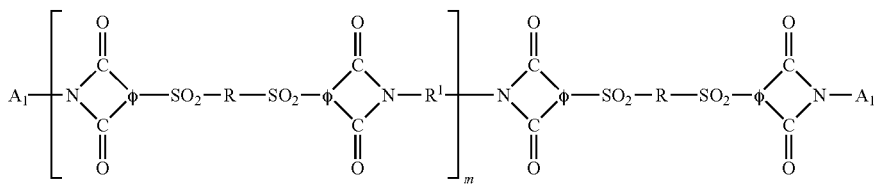

wherein R and $R^1$ are divalent aromatic organic radicals having from 6-20 carbon atoms, preferably including an ethynyl group, or a divalent ethynyl radical. R and $R^1$ may include halogenated aromatic $C_{(6-20)}$ hydrocarbon derivatives; alkylene radicals and cycloalkylene radicals having from 2-20 carbon atoms; $C_{(2-8)}$ alkylene terminated polydiorganosiloxanes; and radicals of the formula:

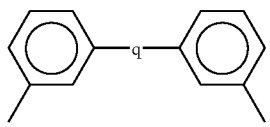

wherein
q=—$C_2$— (e.g., ethenyl, ethylene, or ethynyl), —$C_yH_{2y}$—, —CO—; —$SO_2$—, —O—, —S—, —SiXX'—, or —SiXX'—O—SiXX'—;
y=1 to 5; and
XX'=aliphatic, aromatic, or hydrogen.

Although the concept of advanced composite blends is probably best suited to linear morphology, the advanced composite blends of the present invention also include multidimensional oligomers and polymers. A multidimensional oligomer includes an aromatic hub and three or more radiating chains or arms, each chain terminating with a crosslinking end cap segment. Each chain includes the resin linkages previously described. Each chain is substantially the same. For example, a multidimensional ether can be prepared by the simultaneous condensation of phloroglucinol with a dihalogen and an end cap monomer.

In multidimensional oligomers the higher density of crosslinking functionalities in a multidimensional array provides increased thermo-oxidative stability to the cured composites. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, azaline (e.g., melamine), or other aromatic moieties may also be used as the hub radical.

Multidimensional polyamideimide oligomers include oligomers of the general formula:
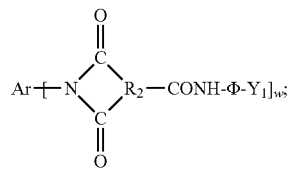
(e)
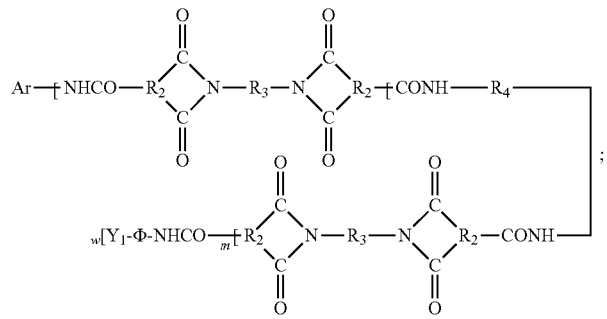
(f)
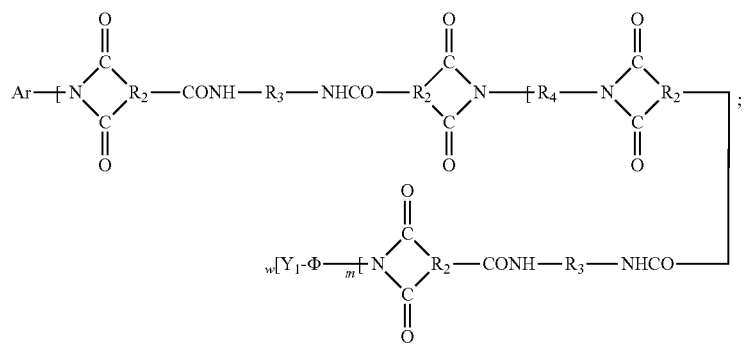
(g)
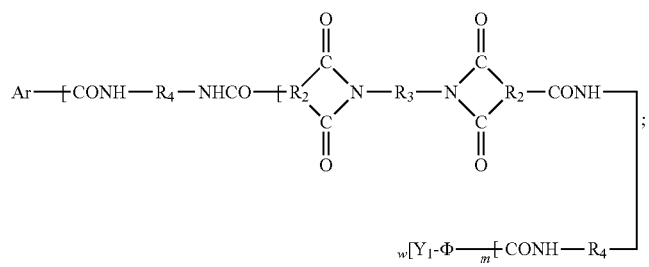
(h)
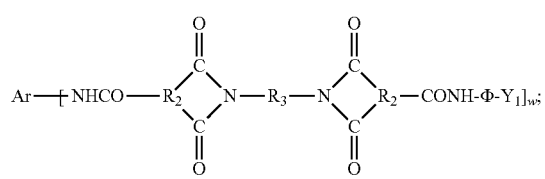
(i)
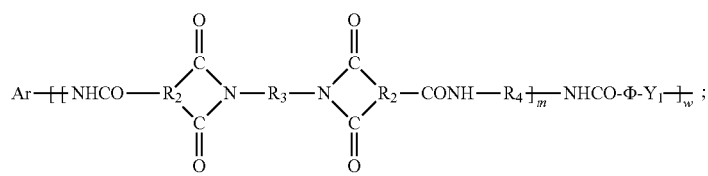
(j)

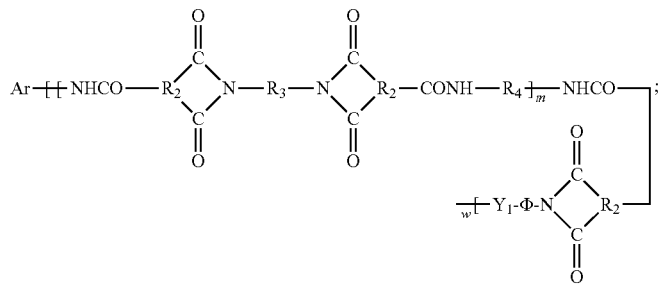
(k)
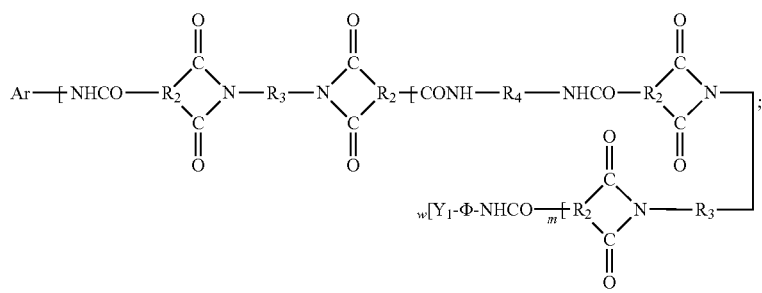
(l)
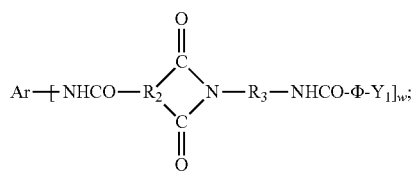
(m)
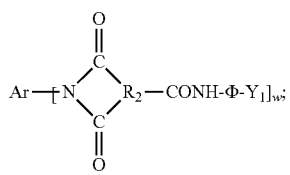
(n)
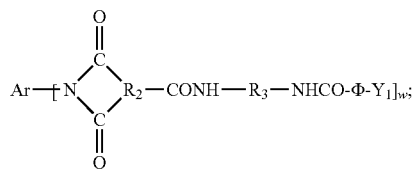
(o)
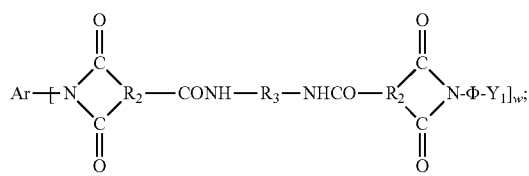
(p)
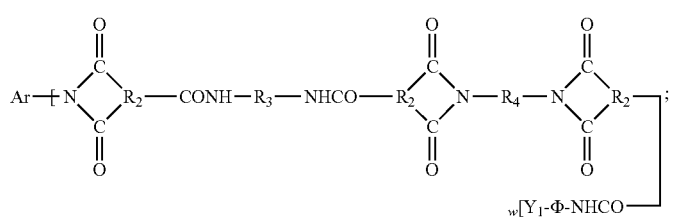
(q)

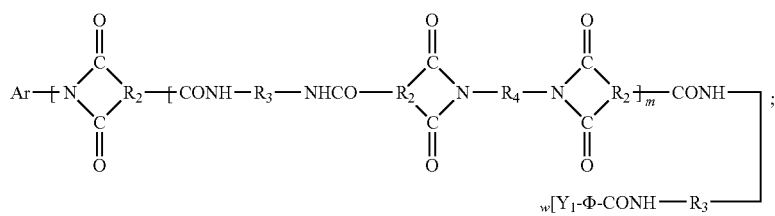

(r)

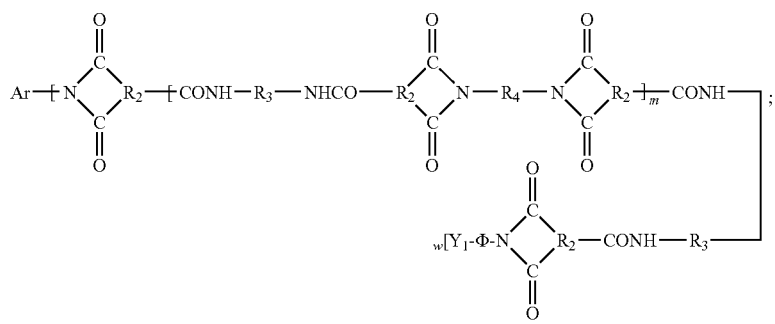

(s)

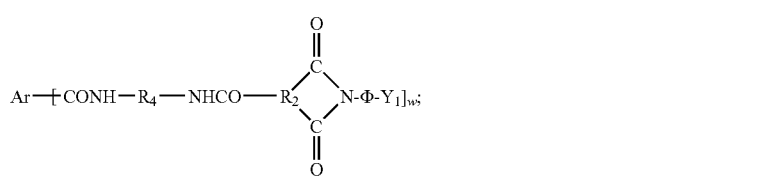

(t)

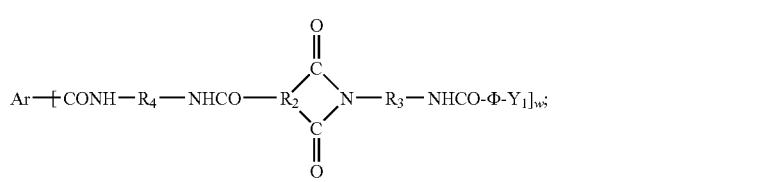

(u)

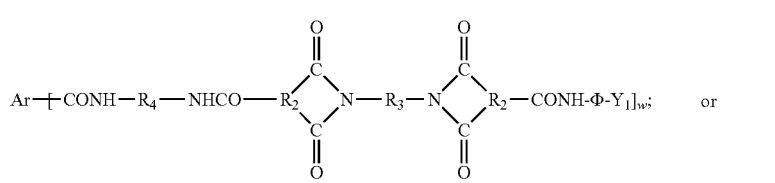

(v)

or wherein Y, R2, R3, R4, and m are as previously defined with respect to the linear amideimides, Ar=an organic radical of valency w; .Φ=phenyl, and w=3 or 4. Preferably, Ar is an aromatic radical (generally phenyl) generally selected from phenyl, naphthyl, biphenyl, azalinyl (such as melamine), or triazine derivatives of the general formula:

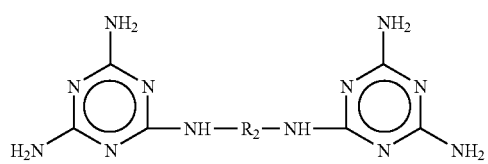

wherein $R_2$=a divalent hydrocarbon residue containing 1-12 carbon atoms, as described in U.S. Pat. No. 4,574,154, or preferably an ethynyl group (i.e., —C2-).

The hub may also be a residue of an etheranhydride of the formula:

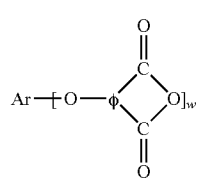

or an etheramine of the formula:

Ar—[—O-φ-NH$_2$]$_w$

The best results are likely to occur when the arm length of the oligomers is as short as possible (to allow ease of processing) and the oligomer has six crosslinking sites (to allow the highest density of crosslinking). In one embodiment, the hub includes the phenyl radical, since these compounds are relatively inexpensive, are more readily obtained, and provide oligomers with high thermal stability.

The chains of the oligomers include crosslinking end caps which improve the solvent-resistance of the cured composites. These end caps may be thermally or chemically activated during the curing step to provide a strongly crosslinked, complex, multi-dimensional array of interconnected oligomers.

The oligomers may be formed by the attachment of arms to the hub followed by chain extension and chain termination. For example, trihydroxybenzene may be mixed with p-aminophenol and 4,4'-dibromodiphenylsulfone and reacted under an inert atmosphere at an elevated temperature to achieve an amino-terminated "star" of the general formula:

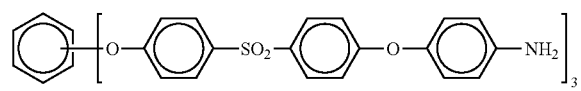

that can be reacted with suitable diacid halides, diamines, and end caps to yield a polyamideimide oligomer.

The etheranhydride hub can be synthesized by reacting nitrophthalic anhydride or halophthalic anhydride with Ar(—OH)w in a suitable solvent under an inert atmosphere, as described generally in U.S. Pat. Nos. 3,933,862 and 4,851,495 (thio-analogs).

The oligomers of course, might be made by reacting nitrophthalic anhydride with an amine functional end cap followed by the condensation with the hydroxy hub or in similar reaction schemes that will be understood by those of ordinary skill.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are oligomer mixtures which can be used without further separation to form desired advanced composites.

Linear or multidimensional oligomers can be synthesized from a mixture of four or more reactants so that extended chains may be formed. Adding components, however, adds to the complexity of the reaction and of its control. Undesirable competitive reactions may result or complex mixtures of macromolecules having widely different properties may be formed, because the chain extenders and chain terminators are mixed, and compete with one another.

Multidimensional etherimides can be made by reacting the etheranhydride hub with compounds of the formulae II, III, and IV previously described.

Multidimensional amides are prepared by condensing a nitro, amine, or acid halide hub with suitable diamines, dicarboxylic acid halides, and amine or acid halide end cap monomers to form oligomers of the general formulae:

Ar—[—CONH—P—NHCO-Q-CONH-ϕ-$D_i$]$_w$;

Ar—[—NHCO-Q-CONH—P—NHCO-ϕ-$D_i$]$_w$;

Ar—[—CONH-ϕ-$D_i$]$_w$;

Ar—[—NHCO-ϕ-$D_i$]$_w$;

Ar—[—CONH—P—NHCO-ϕ-$D_i$]$_w$;

or

Ar—[—NHCO-Q-CONH-Φ-$D_i$]$_w$, wherein Ar, w, -Φ-, and D are as previously defined, P=a residue of a diamine (preferably containing acetylenic functionality), and Q=a residue a dicarboxylic acid halide.

Multidimensional imides can be made using the amine, etheranhydride, or etheramine hubs with suitable dianhydrides, and amine or anhydride end caps. Particularly preferred multidimensional imides include by condensing anhydride end caps directly with the amine hubs.

Multidimensional polyesters can be made using hydroxy or carboxylic acid hubs (particularly cyuranic acid) with suitable diols and diacid halides. Carboxylic acid hubs include those compounds described in U.S. Pat. No. 4,617,390 and compounds prepared by reacting polyols, such as phloroglucinol, with nitrobenzoic acid or nitrophthalic acid to form ether linkages and active, terminal carboxylic acid funtionalities. The nitrobenzoic acid products would have three active sites while the nitrophthalic acid products would have six; each having the respective formula:

ϕ-[—O-ϕ-COOH]$_3$ or

ϕ-[—O-ϕ-(COOH)$_2$]$_3$ wherein Φ=phenyl. Of course other nitro/acids can be used.

Hubs can also be formed by reacting the corresponding halo-hub (such as tribromobenzene) with aminophenol to form triamine compounds represented by the formula:

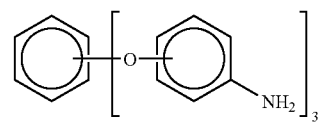

which can then be reacted with an acid anhydride to form a polycarboxylic acid of the formula:

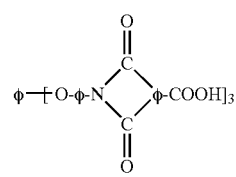

wherein Φ=phenyl; the hub being characterized by an intermediate ether and imide linkage connecting aromatic groups. Thio-analogs are also contemplated, in accordance with U.S. Pat. No. 3,933,862.

The hub may also be a polyol such as those described in U.S. Pat. No. 4,709,008 to tris(hydroxyphenyl)alkanes of the general formula:

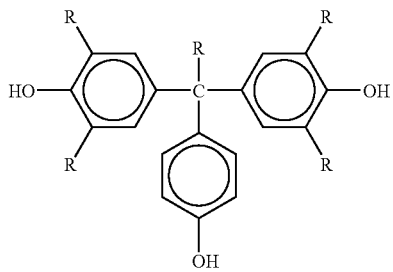

wherein R=hydrogen or methyl and can be the same or different. The polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469).

The polyols may also be reacted with nitrophthalic anhydride, nitroaniline, nitrophenol, or nitrobenzoic acids to form other compounds suitable as hubs as will be understood by those of ordinary skill.

Phenoxyphenyl sulfone arms radiating from a hub with a terminal amine, carboxylic acid, or hydroxyl group are also precursors for making multidimensional polyester oligomers of the present invention.

The best results are likely to occur when the hub is phloroglucinol or cyuranic acid. In either case a suitable end-cap monomer (phenol or acid halide) can be reacted with the hub to form "short-armed," multidimensional oligomers having three or six crosslinking sites. These compounds are the simplest multidimensional oligomers and are relatively inexpensive to synthesize.

Multidimensional amides, amide imides, heterocycles, and heterocycle sulfones can be prepared using these carboxylic acid hubs, as will be understood by those of ordinary skill in the art.

Multidimensional oligomers of the formula:

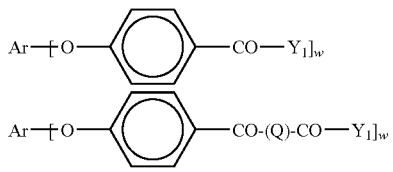

can also be synthesized with an Ullmann aromatic ether synthesis followed by a Friedel-Crafts reaction. Wherein, Q=

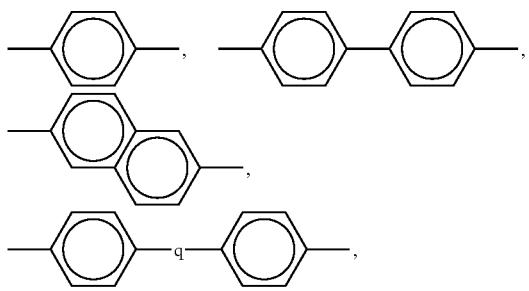

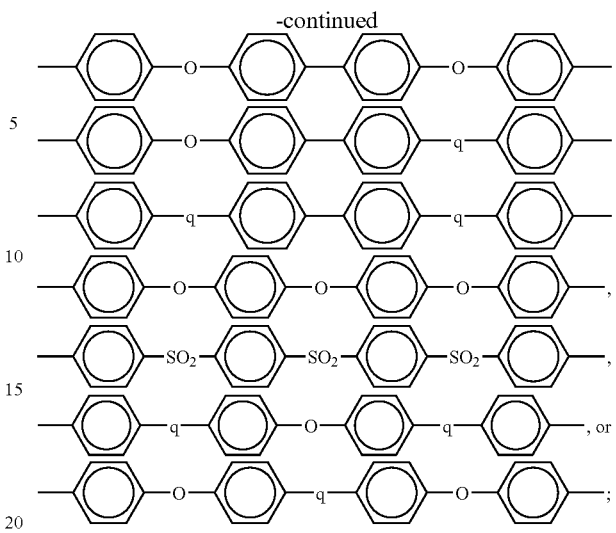

$q$=—$SO_2$—, —CO—, —S—, or —$(CF_3)_2C$—, and preferably —$SO_2$—, or —CO—, and most preferably —$C_2$— (e.g., ethenyl, ethylene, or ethynyl); and $Y_1$=a crosslinking end cap as previously defined (i.e. $D_i$-Φ-).

To form the Ar—O-Φ-CO—$Y_1]_w$ oligomers, a halosubstituted hub is reacted with phenol in DMAC with a base (NaOH) over a Cu Ullmann catalyst to produce an ether "star" with active hydrogens para- to the ether linkages. For example, 1 mole of trichlorobenzene can be reacted with about 3 moles of phenol in the Ullmann ether reaction to yield an intermediate of the general formula: Φ-(—O-Φ)$_3$, which can be reacted with about 3 moles of ($Y_1$)—COCl to produce the final, crosslinkable, ether/carbonyl oligomer.

Blends can improve impact resistance of pure oligomer composites without causing a significant loss of solvent resistance. The advanced composite (i.e. mixed chemical) blends of the present invention comprise mixtures of one or more crosslinkable oligomer and one or more polymer from a different chemical family. The polymers are incapable of crosslinking. The crosslinkable oligomer and the compatible polymer can be blended together by mixing mutually soluble solutions of each. While the blend is often equimolar in the oligomer and polymer, the ratio of the oligomer and polymer can be adjusted to achieve the desired physical properties. The properties of the composite formed from the advanced composite blend can be adjusted by altering the ratio of formula weights for the polymer and oligomer.

In synthesizing the polymers, quenching compounds can be employed, if desired, to regulate the polymerization of the comparable polymer, so that, especially for linear systems, the polymer has an average formula weight initially substantially greater than the crosslinkable oligomer. For thermal stability, an aromatic quenching compound, such as aniline, phenol, or benzoic acid chloride is preferred. The non-crosslinking polymer can be made by the same synthetic method as the oligomer with the substitution of a quenching cap for the crosslinking end cap.

While the best advanced composite blends are probably those of modest formula weight and those in which the oligomer and polymer are in equimolar proportions, other compositions may be prepared, as will be recognized by those of ordinary skill in the art.

Solvent resistance of the cured composite may decrease markedly if the polymer is provided in large excess to the oligomer in the blend.

The advanced composite blends may, in the case of coreactive oligomers and in other cases, include multiple oligomers or multiple polymers, such as a mixture of an amideimide oligomer, an amide oligomer, and an imide polymer or a mixture of an amideimide oligomer, an amideimide polymer, and an imide polymer (i.e. blended amideimide further blended with imide). When polyimide oligomers are used, the advanced composite blend can include a coreactant, such as p-phenylenediamine, benzidine, or 4,4'-methylene-dianiline. Ethersulfone oligomers can include these imide coreactants or anhydride or anhydride-derivative coreactants, as described in U.S. Pat. No. 4,414,269. Other combinations of oligomers, polymers, and coreactants can be used, as will be recognized by those of ordinary skill in the art.

As discussed above, the oligomeric component of the advanced composite blend may itself be a blend of the oligomer and a compatible polymer from the same chemical family, further blended with the compatible polymer from the different family. The advanced composite blends, also, can simply be made from three or more oligomeric or polymeric components. They generally include only one oligomeric component unless coreactive oligomers are used.

HYPOTHETICAL EXAMPLES

1. Synthesis of Compound (a) from Above

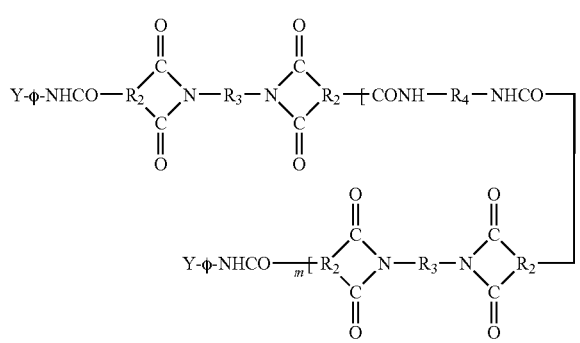

A diamine of the formula $H_2N-R_3-NH_2$ is reacted with two moles of an acid anhydride of the formula:

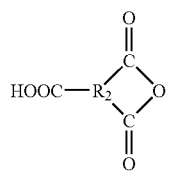

to form a dicarboxlic acid intermediate of the formula:

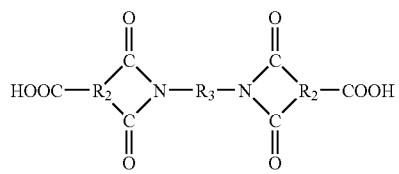

The intermediate is converted to the corresponding diacid chloride in the presence of $SOCl_2$, which is then condensed with one mole of a diamine of the formula H2N—NR4-NH$_2$ and two moles of an amine endcap of the formula Y-Φ-NH$_2$ to yield the desired product.

If excess diamine of the formula $H_2N-R_4-NH_2$ is used along with an acid halide endcap of the formula Y-Φ-COX, the product can have the formula:

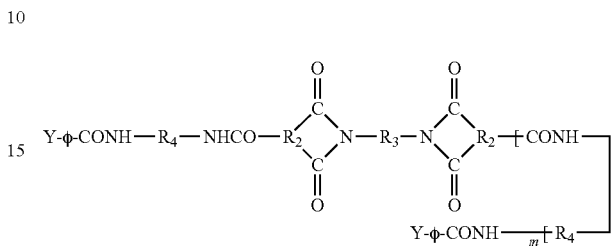

2. Synthesis of Compound (b) from Above

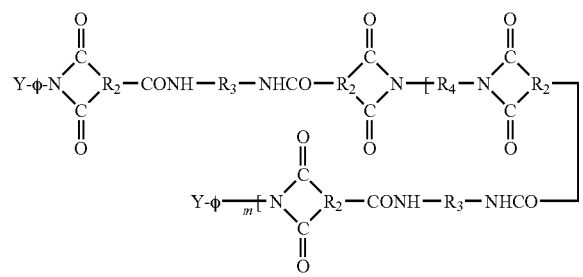

A diamine of the formula $H_2N-R_3-NH_2$ is reacted with

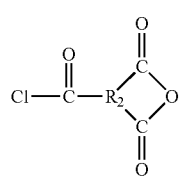

to yield a dianhydride intermediate of the formula:

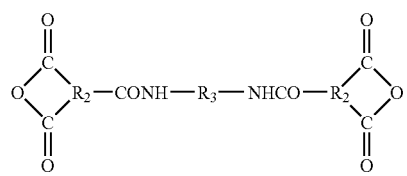

The intermediate is then condensed with Y-Φ-COCl and a diamine of the formula H$_2$N—R$_4$—NH$_2$ to yield the desired product.

3. Synthesis of Compound (d) from Above

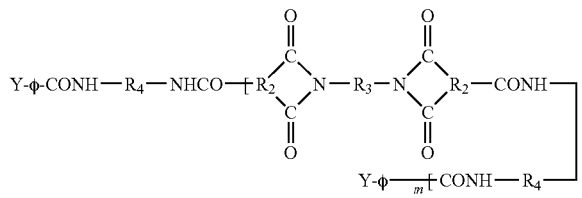

A diamine of the formula H$_2$N—R$_3$—NH$_2$ is reacted with an acid anhydride as in Example 1 to form a dicarboxylic acid intermediate that can be reacted with another diamine of the formula H$_2$N—R$_4$—NH$_2$ and an acid halide endcap of the formula Y-Φ-COCl to yield the desired product.

4. Synthesis of Amideimide Having One Diamine

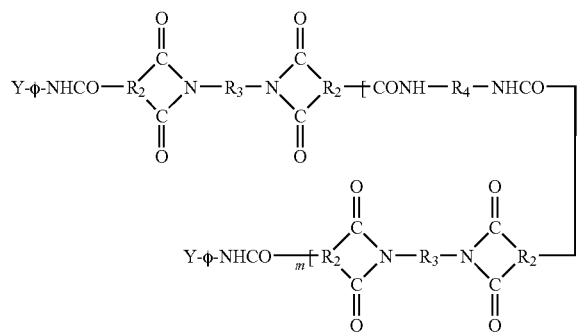

Two moles of an amine endcap are reacted with about (m+2) moles of an acid anhydride, such as phthalyl acid anhydride, and about (2 m+1) moles of a diamine, such as H$_2$N— Φ-SO$_2$_ Φ-O— Φ-SO$_2$—NH$_2$, to yield the desired product. To avoid side or competitive reactions, it is probably desirable to prepare a dicarboxylic acid intermediate of the formula:

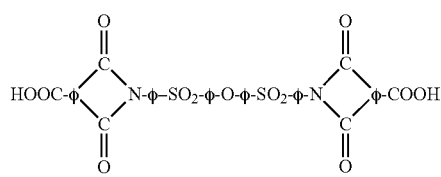

by mixing the acid anhydride and diamine in the ratio of about 2 moles acid anhydride:1 mole diamine prior to adding the remaining reactants for simultaneous condensation to the oligomer.

5. Preparation of an Advanced Composite Blend

The polyamideimide oligomer of Example 1, wherein R$_2$=R$_4$=phenyl, R$_3$=—C$_2$—; m=1, and Y=

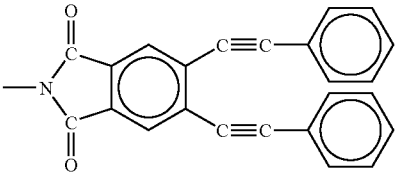

is dissolved in a suitable solvent.

A relatively high-average-formula weight polyether polymer is made by condensing a dialcohol of the general formula.

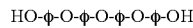

HO-Φ-O-Φ-O-Φ-OH with Cl-Φ-Cl and phenol (to quench the polymerization) under an inert atmosphere in the same solvent as used with the polyamideimide or another solvent miscible with that of the polyamideimide.

The two solutions are mixed to form the advanced composite blend, which can be prepregged or dried prior to curing to an advanced amideimide/ether composite.

6. Synthesis of a Multidimensional Polyamide

The oligomer is prepared by reacting:

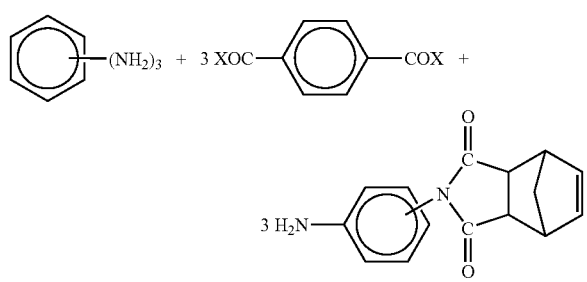

under an inert atmosphere to yield:

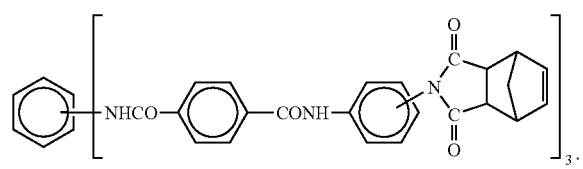

7. Synthesis of a Difunctional, Multidimensional Polyamide

The oligomer is prepared by reacting:

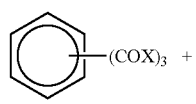

-continued

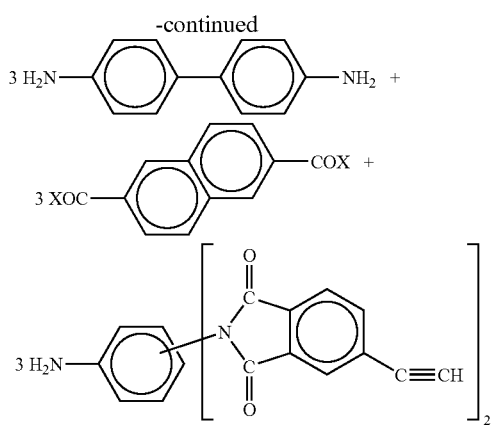

under an inert atmosphere to yield:

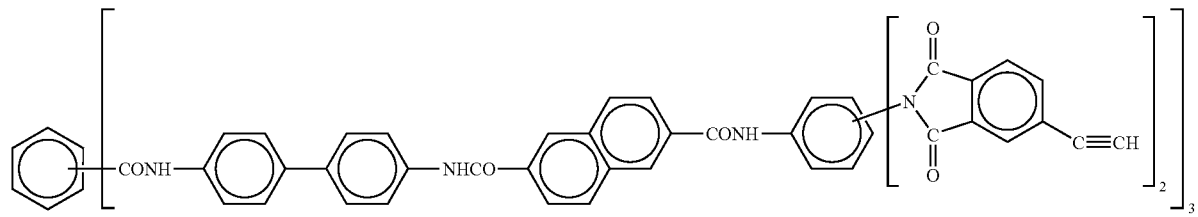

Competitive side reactions between the reactants in Example 7 will likely hinder the yield of this product and will make isolation of the product difficult. Yield can be enhanced by adding the reactants serially, but the physical properties of the resulting oligomers might be impaired.

8. Synthesis Using an Etheramine Hub

Another multidimensional oligomer is prepared by reacting:

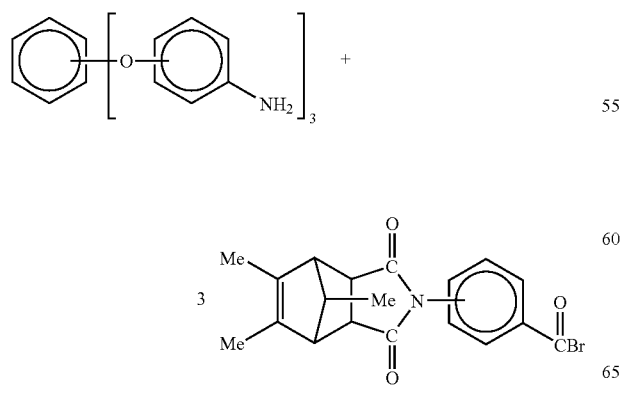

Under an inert atmosphere to yield:

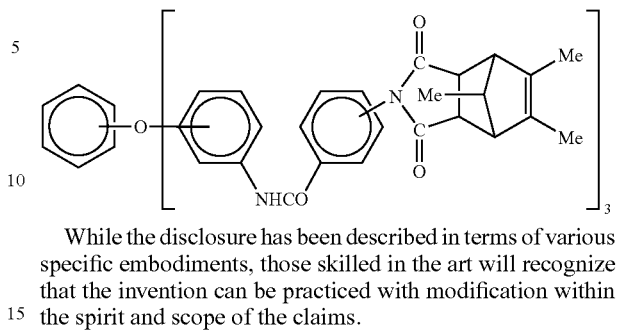

While the disclosure has been described in terms of various specific embodiments, those skilled in the art will recognize that the invention can be practiced with modification within the spirit and scope of the claims.

What is claimed is:

1. A polyacetylinic oligomer comprising the formula:

D-A-D wherein

D is an endcap including at least one crosslinking functionality, wherein D is

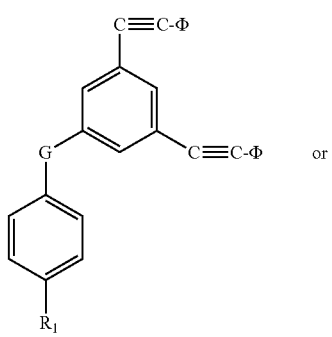

or

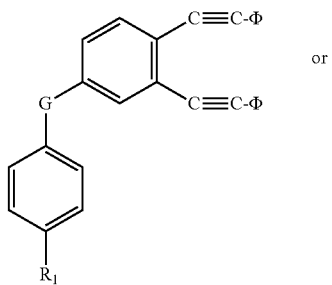

or

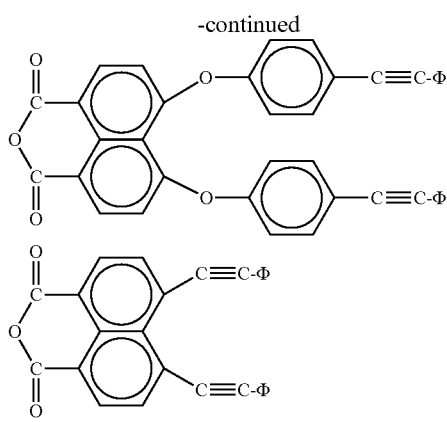 or wherein φ=phenyl; G=—SO$_2$—, —S—, —O—, —CH$_2$—, —CO—, —SO—, C$_3$F$_6$, or NHCO; and R$_1$=amine, hydroxyl, acid chloride, or anhydride, where R$_1$ is the point of attachment to A; and A is a backbone selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone;

wherein, said backbone includes one or more ethynyl functional groups incorporated therein.

2. A polyacetylinic oligomer in accordance with claim 1 wherein A comprises repeating units of the formula:

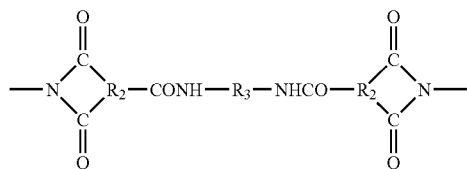

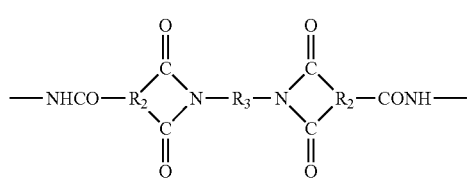

wherein

R$_3$=an aromatic, aliphatic, or alicyclic radical including an ethynyl functional group, or an ethynyl radical; and R$_2$=an organic moiety.

3. A polyacetylinic oligomer in accordance with claim 1, wherein the oligomer is selected from the following formula:

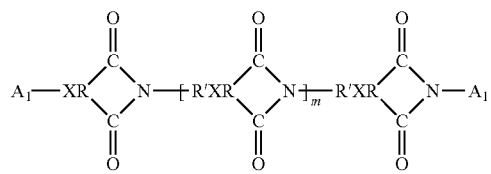

wherein;

X=—O—, or —S—; A$_1$=is an endcap including at least one crosslinking functionality; R=a trivalent C$_{(6-13)}$ aromatic organic radical; R$_1$=amide, imide, or sulfone; R'=a divalent C$_{(6-13)}$ aromatic or ethynyl radical; and m is 1, 2, 3, or 4.

4. A polyacetylinic oligomer in accordance with claim 1, wherein the oligomer is selected from the following formula:

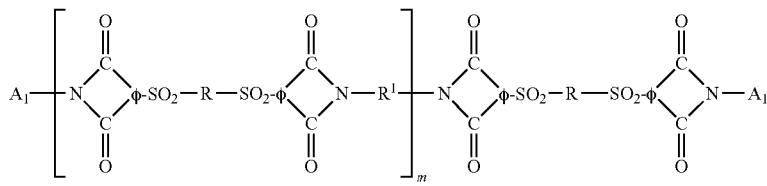

wherein;

R and R$^1$ are divalent aromatic organic radicals having from 6-20 carbon atoms including an ethynyl group, a divalent ethynyl radical; or radicals of the formula:

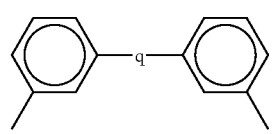

wherein q=—C$_2$—, A$_1$=is an endcap including at least one crosslinking functionality; and m is 0, 1, 2, 3, 4, or 5.

5. An advanced composite blend comprising a polyacetylinic oligomer having the formula:

D-A-D wherein

D is an endcap including at least one crosslinking functionality, wherein D is

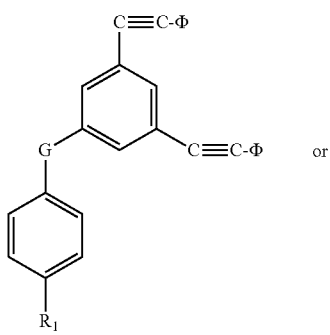

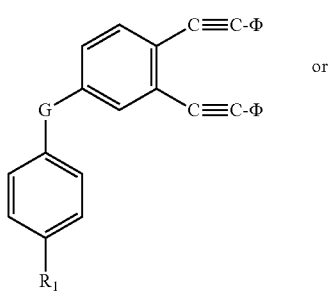

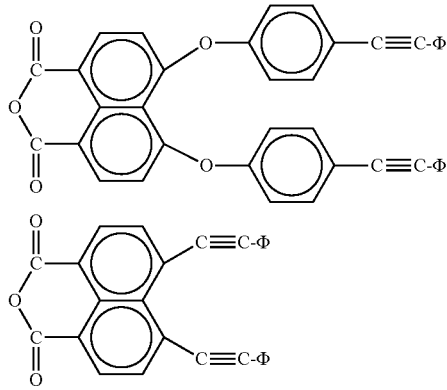

wherein Φ=phenyl; G=—SO$_2$—, —S—, —O—, —CH$_2$—, —CO—, —SO—, C$_3$F$_6$, or NHCO; and R$_1$=amine, hydroxyl, acid chloride, or anhydride, where R$_1$ is the point of attachment to A; and A is a backbone comprising repeating units of the formula:

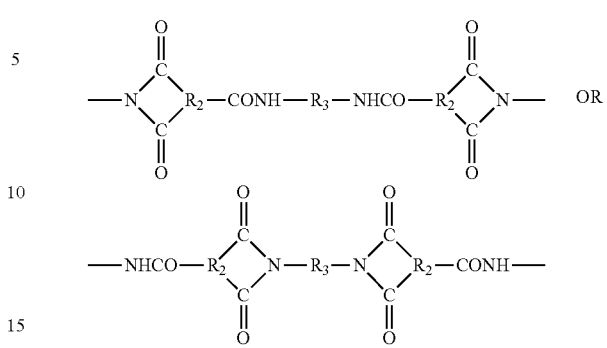

wherein
R$_3$=an aromatic, aliphatic, or alicyclic radical including at least one ethynyl functional group or an ethynyl radical; and R$_2$=an organic moiety; and
at least one compatible polymer from a different chemical family than the polyacetylinic oligomer.

6. An advanced composite blend in accordance with claim 5 wherein A is a polyetherimide or polysulfoneimide, and the oligomer has the formula:

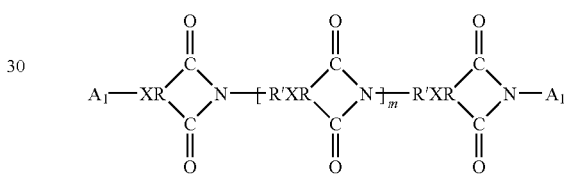

wherein;
X=—O—, or —S—; A$_1$=is an endcap including at least one crosslinking functionality; R=a trivalent C$_{(6-13)}$ aromatic organic radical; R$_1$=amide, imide, or sulfone; R'=a divalent C$_{(6-30)}$ aromatic or ethynyl radical; and m is 1, 2, 3, or 4.

7. An advanced composite blend in accordance with claim 5 wherein the at least one polymer is selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone.

* * * * *